(12) United States Patent
Lee et al.

(10) Patent No.: US 12,032,800 B2
(45) Date of Patent: Jul. 9, 2024

(54) METHOD OF PERFORMING OUTPUT ON DISPLAY MODULE AND ELECTRONIC DEVICE PERFORMING THE METHOD

(71) Applicant: SAMSUNG ELECTRONICS CO., LTD., Suwon-si (KR)

(72) Inventors: Youngsu Lee, Suwon-si (KR); Youngjoon Yang, Suwon-si (KR); Sangheon Kim, Suwon-si (KR); Yeunwook Lim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/078,691

(22) Filed: Dec. 9, 2022

(65) Prior Publication Data

US 2023/0185422 A1 Jun. 15, 2023

Related U.S. Application Data

(63) Continuation of application No. PCT/KR2022/011632, filed on Aug. 5, 2022.

(30) Foreign Application Priority Data

Aug. 10, 2021 (KR) ........................ 10-2021-0105474

(51) Int. Cl.
*G06F 3/0481* (2022.01)

(52) U.S. Cl.
CPC .. *G06F 3/0481* (2013.01); *G06F 2203/04803* (2013.01)

(58) Field of Classification Search
CPC .. G06F 3/0481; G06F 3/0482; G06F 3/04842; G06F 2203/04803
See application file for complete search history.

(56) References Cited

U.S. PATENT DOCUMENTS

| 9,652,111 | B2 | 5/2017 | Ho | |
|---|---|---|---|---|
| 2021/0405856 | A1* | 12/2021 | Fu | ........................ G06F 3/04845 |
| 2022/0357845 | A1* | 11/2022 | Luo | ........................ G09G 5/001 |

FOREIGN PATENT DOCUMENTS

| CN | 110865744 A | 3/2020 |
|---|---|---|
| CN | 112578982 A | 3/2021 |
| CN | 113079244 A | 7/2021 |
| KR | 101331030 B1 | 11/2013 |
| KR | 101713167 B1 | 3/2017 |

(Continued)

OTHER PUBLICATIONS

Sandra L. Toze et al., Group Participation in the Search Process?, May 1, 2011, IEEE Explore, pp. 69-76 (Year: 2011).*

(Continued)

*Primary Examiner* — Tam T Tran
(74) *Attorney, Agent, or Firm* — CANTOR COLBURN LLP

(57) ABSTRACT

A method of performing an output on a display module and an electronic device performing the same are provided. A method of performing an output on a display module of an electronic device, according to various example embodiments, includes identifying a plurality of activities executed in a same task, identifying pair information on a relationship between the plurality of activities, and outputting at least one activity of the plurality of activities on the display module, based on the pair information.

20 Claims, 15 Drawing Sheets

(56) References Cited

FOREIGN PATENT DOCUMENTS

| KR | 20170022679 A | 3/2017 |
| KR | 20170141453 A | 12/2017 |
| KR | 102127925 B1 | 6/2020 |
| KR | 20210072367 A | 6/2021 |

OTHER PUBLICATIONS

Seyed Amin Tabatabaei et al., Identifying Patient Groups based on Frequent Patterns of Patient Samples, Oct. 1, 2019, International Conference on E-Health Networking—Application & Services, pp. 1-6 (Year: 2019).*

International Search Report and Written Opinion for International Application No. PCT/KR2022/011632; International Filing Date Aug. 5, 2022; dated Nov. 4, 2022; 9 Pages.

* cited by examiner

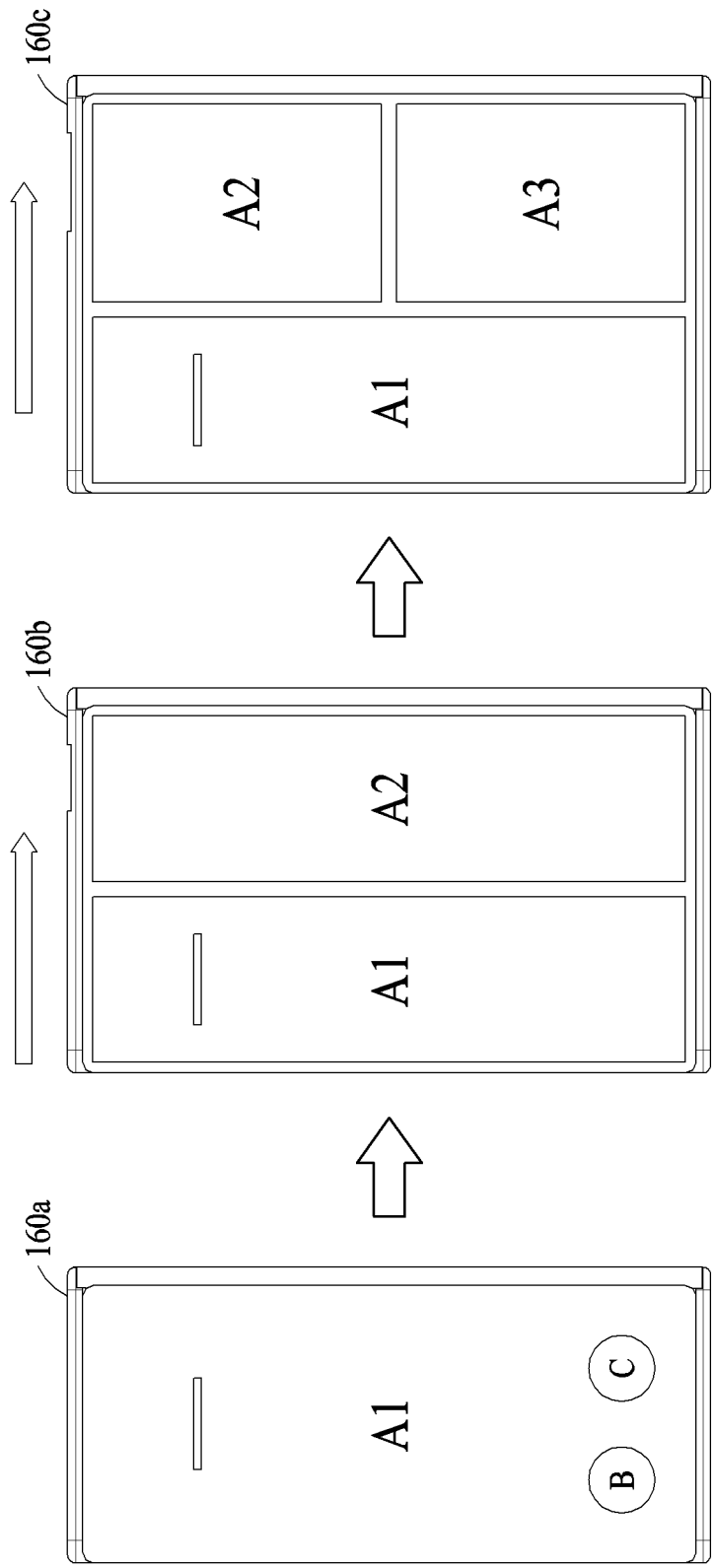

METHOD OF PERFORMING OUTPUT ON DISPLAY MODULE AND ELECTRONIC DEVICE PERFORMING THE METHOD

CROSS-REFERENCE TO RELATED APPLICATIONS

This application is a national stage application of International Application No. PCT/KR2022/011632 designating the United States, filed on Aug. 5, 2022, in the Korean Intellectual Property Receiving Office and claiming priority to Korean Patent Application No. 10-2021-0105474, filed on Aug. 10, 2021, in the Korean Intellectual Property Office, the disclosures of which are incorporated by reference herein in their entireties.

BACKGROUND

1. Field

The disclosure relates to a method of performing an output on a display module and an electronic device performing the same.

2. Description of Related Art

A conventional electronic device manages activities according to an operation of an application or a program having a structure in which the activities are stacked in a stack form. Among the activities stacked in the stack form, a top-level activity is output on a display.

The electronic device provides a multi-window feature, and when different applications are executed at the same time, the electronic device splits the display to display several applications at the same time.

SUMMARY

Example embodiments of the disclosure may provide a method of performing an output on a display module and a computing device performing the method of performing an output on a display module, capable of splitting a plurality of activities executed in a single task and outputting the split activities on a display module.

Example embodiments of the disclosure may provide a method of performing an output on a display module and a computing device performing the method of performing an output on a display module, capable of setting a plurality of activities executed in a single task in activity record groups to output the plurality of activities on the display module and determining a visibility and a lifecycle of an activity in each of the activity record groups.

Example embodiments of the disclosure may provide a method of performing an output on a display module and a computing device performing the method of performing an output on a display module, capable of outputting a plurality of activities on a display according to various form factors of an electronic device.

According to various example embodiments, a method of performing an output on a display module of an electronic device includes: identifying a plurality of activities executed in the same task; identifying pair information on a relationship between the plurality of activities; and outputting at least one activity of the plurality of activities on the display module of the electronic device based on the pair information.

According to various example embodiments, an electronic device which performs a method of performing an output on a display module includes: a display module and a processor, wherein the processor is configured to: identify a plurality of activities executed in the same task; identify pair information on a relationship between the plurality of activities; and output at least one activity of the plurality of activities on the display module, based on the pair information.

According to various example embodiments, an electronic device which performs a method of performing an output on a display module includes: a display module and a processor, wherein the processor is configured to: set state information of a task based on a user input; identify a plurality of activities executed in the task; identify pair information on a relationship between the plurality of activities; and output at least one activity of the plurality of activities on the display module, based on the pair information and the state information of the task.

According to various example embodiments, a plurality of activities may be output on a display module and a visibility and a lifecycle of the plurality of activities may be ensured by setting the plurality of activities in activity record groups.

According to various example embodiments, a plurality of activities may be output on a display module by using a method of performing an output on a display module and a computing device performing the method of performing an output on a display module, even in a case that a task, such as an application does not set or support to split and output the plurality of activities on the display module.

According to various example embodiments, a plurality of activities may be output on a display module according to various form factors of an electronic device, and the plurality of activities may be output on the display module depending on a change in the display module, for example, an expansion, a reduction, and/or a change, according to a use.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIGS. 11A, 11B, 11C, 12, 13, and 14 illustrate a plurality of activities output on a display module based on a form factor of an electronic device according to various example embodiments.

DETAILED DESCRIPTION

Figure 1:
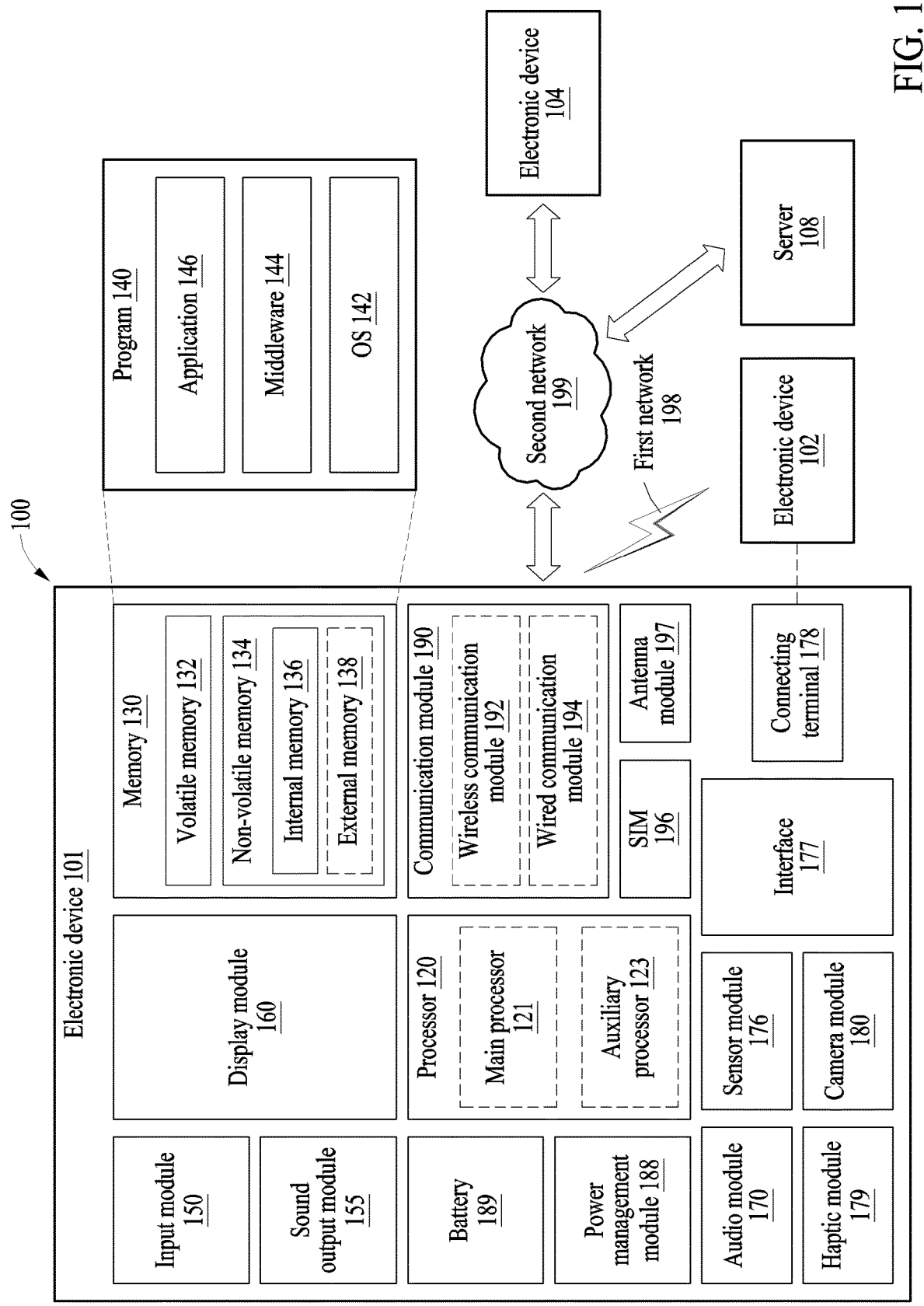
FIG. 1 is a block diagram illustrating an example electronic device in a network environment according to various example embodiments.

One or more embodiments of the invention now will be described more fully hereinafter with reference to the accompanying drawings, in which various embodiments are shown. One or more embodiments may, however, be embodied in many different forms, and should not be construed as limited to the embodiments set forth herein. Rather, these embodiments are provided so that this disclosure will be thorough and complete, and will fully convey the scope of embodiments of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, various example embodiments will be described in greater detail with reference to the accompanying drawings. When describing the example embodiments with reference to the accompanying drawings, like reference numerals refer to like elements and a repeated description related thereto will be omitted.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In some example embodiments, at least one (e.g., the connecting terminal 178) of the above components may be omitted from the electronic device 101, or one or more other components may be added in the electronic device 101. In some example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
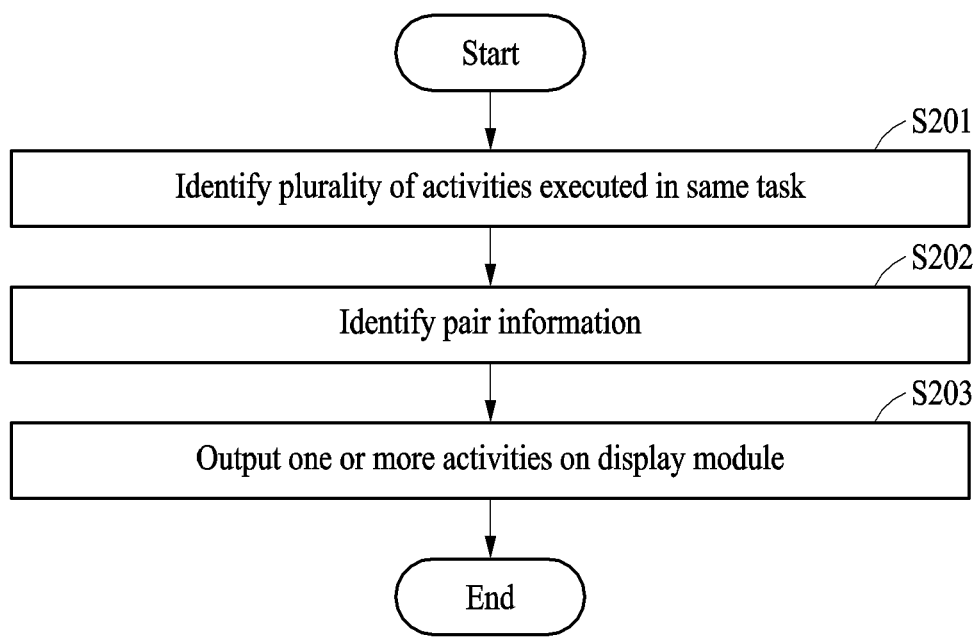
FIG. 2 is a flowchart illustrating an operation of an electronic device according to various example embodiments.

FIG. 2 is a flowchart illustrating an operation of an electronic device (e.g., the electronic device 101 of FIG. 1) according to various example embodiments.

Referring to FIG. 2, in operation S201, the electronic device according to various example embodiments may identify a plurality of activities executed in the same task. For example, the task may be a program (e.g., the program 140 of FIG. 1) executable by a processor (e.g., the processor 120 of FIG. 1) of the electronic device. For example, the task may correspond to an application (e.g., the application 146 of FIG. 1) executable by the electronic device.

In operation S202, the electronic device according to various example embodiments may identify pair information. For example, the pair information may be a relationship between the plurality of activities.

The pair information according to various example embodiments may indicate a from-to relationship between the plurality of activities. For example, the from-to relationship may be a relationship in which a previously executed activity is a source and the other activity executed from the source is a target, when the other activity is executed from a predetermined activity.

For example, when Activity 2 is executed from Activity 1 according to a user input, the pair information may be set Activity 1 to a source and Activity 2 to a target.

The electronic device according to various example embodiments may receive the pair information from a server (e.g., the server 108 of FIG. 1) capable of communicating with the electronic device. For example, the electronic device may receive, from the server, the pair information defined for the plurality of activities and store the pair information in a memory (e.g., the memory 130 of FIG. 1, or a repository) of the electronic device. The electronic device may identify the pair information stored in the memory.

The pair information according to various example embodiments may be pre-set in the task. For example, the pair information between the plurality of activities may be defined in metadata such as Extensible Markup Language (XML), JavaScript Object Notation (JSON) of the application. The electronic device may identify the pair information defined in the metadata of the application.

For example, the electronic device may identify the task by using a package name and a class name of the task and output the plurality of activities executed in the task on a display module. The electronic device may identify the task by using the package name and the class name and output the plurality of activities on the display module, even in a case that the pair information for the activities executed in the corresponding class name is not defined.

For example, when a package name of the task is "com.wemakeprice" and a class name is "com.wemakeprice.MainTabActivity", the corresponding task be may identified and the plurality of activities executed in the class name "com.wemakeprice.MainTabActivity" may be output on the display module. For example, the activity of the class name "com.wemakeprice.MainTabActivity" of the task may be output on the left region of the display module, and the activity executed from the activity of the class name "com.wemakeprice.MainTabActivity" may be output on the right region of the display module. For example, the electronic device may output the activity of the class name "com.wemakeprice.MainTabActivity" of the task on the left region of the display module, and may output other activity which of the class name of the task is not "com.wemakeprice.MainTabActivity" on the right region of the display module.

Table 1 below is an example of the package name and the class name that may be identified by the electronic device. Table 1 is only one example and is not intended to be exhaustive, as many such relationships can be defined.

TABLE 1

| App Name | Package name | ClassName |
| --- | --- | --- |
| Wish | com.contextlogic.wish | com.contextlogic.wish.activity.browse.BrowseActivity |
| SHEIN | com.zzkko | com.zzkko.bussiness.login.ui.MainTabsActivity |
| Wemakeprice | com.wemakeprice | com.wemakeprice.MainTabActivity |
| Naver cafe | com.nhn.android.navercafe | com.nhn.android.navercafe.feature.section.HomeActivity |
| Tmon | com.tmon | com.tmon.main.MainActivity |
| WhatsApp | com.whatsapp | com.whatsapp.HomeActivity |
| WhatsApp business | com.whatsapp.w4b | com.whatsapp.HomeActivity |
| Coupang | com.coupang.mobile | com.coupang.mobile.domain.home.main.activity.MainActivity |
| Signal | org.thoughtcrime.securesms | org.thoughtcrime.securesms.MainActivity |
| Line | jp.naver.line.android | jp.naver.line.android.activity.main.MainActivity |
| 58 city | com.wuba | com.wuba.home.activity.HomeActivity |
| Gmarket | com.ebay.kr.gmarket | com.ebay.kr.gmarket.eBayKoreaGmarketActivity |
| Auction | com.ebay.kr.auction | com.ebay.kr.auction.eBayKoreaAuctionActivity |
| Knox Messenger | com.sds.mysinglesquare | com.sds.mysinglesquare.main.activity.MainActivity |

TABLE 1-continued

| App Name | Package name | ClassName |
| --- | --- | --- |
| DingDing | com.alibaba.android.rimet | com.alibaba.android.rimet.biz.LaunchHomeActivity |
| Weibo | com.sina.weibo | com.sina.weibo.MainTabActivity |
| VIP, WeiPinHui | com.achievo.vipshop | com.achievo.vipshop.homepage.activity.MainActivity |

The pair information according to various example embodiments may be set according to the user input. For example, the electronic device may set the pair information between the plurality of activities based on the user input. For example, when Activity 2 is executed from Activity 1 in the task, the pair information, in which Activity 1 is a source and Activity 2 is a target, may be set based on the user input. The electronic device may identify the pair information set based on the user input.

In operation S203, the electronic device according to various example embodiments may output one or more activities on the display module. For example, the electronic device may output the activities on the display module, based on the pair information. For example, when the pair information in which Activity 1 is a source and Activity 2 is a target is identified, the electronic device may output Activity 1 and Activity 2 on the display module at the same time.

Figure 3A:
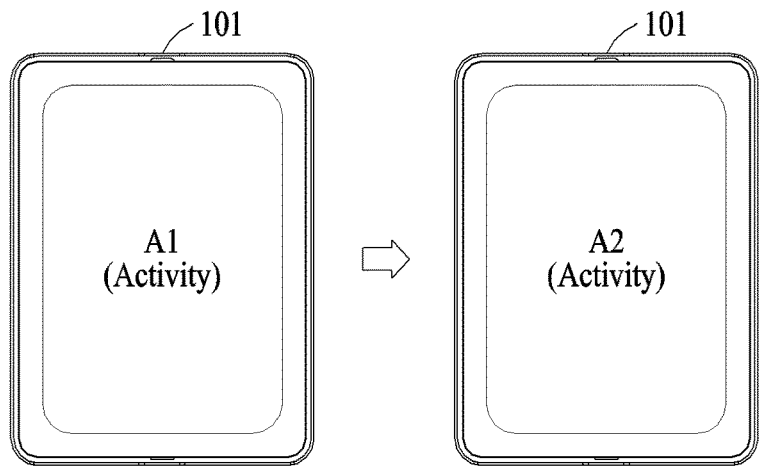
FIGS. 3A, 3B, and 3C illustrate an activity output on a display module according to various example embodiments.
Figure 3B:
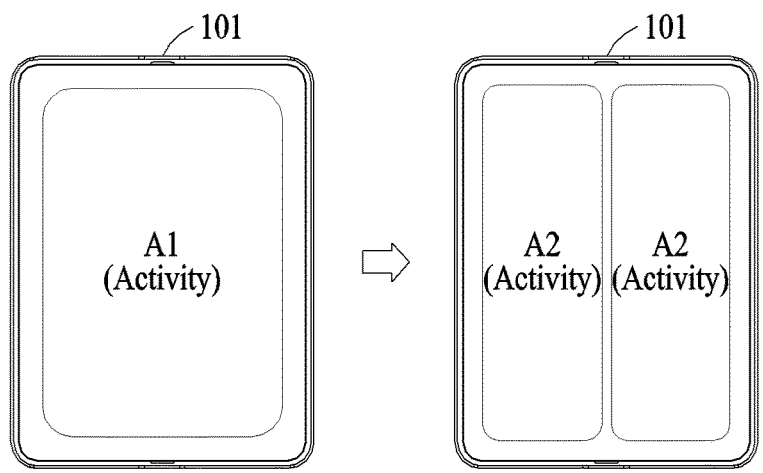
Figure 3C:
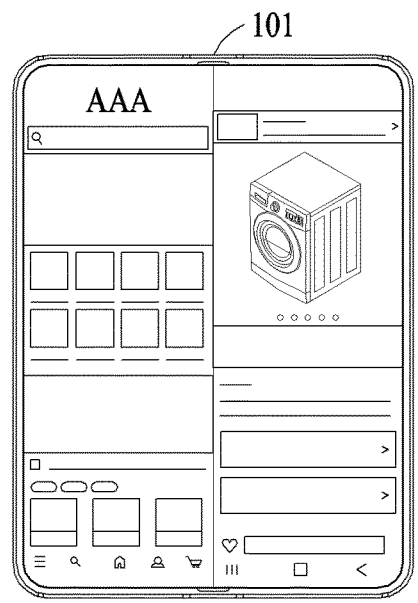

FIGS. 3A, 3B, and 3C illustrate an activity output on a display module according to various example embodiments. An electronic device (e.g., the electronic device 101 of FIG. 1) illustrated in FIGS. 3A-3C may represent an activity output on a foldable display, but is not limited thereto, and one or more activities may be output on the display module of the electronic device with various form factors, as described later.

FIG. 3A illustrates the activity output on the display module when Activity A2 (Activity 2) is executed from Activity A1 (Activity 1) in the electronic device 101 according to various example embodiments.

FIG. 3A illustrates an output screen of the display module of the electronic device 101 when pair information between Activity A1 and Activity A2 is not defined. The electronic device 101 may output Activity A2 on the display module, when Activity A2 is executed from Activity A1 and the pair information between Activity A1 and Activity A2 is not defined.

FIG. 3B illustrates the output screen of the display module of the electronic device 101 when the pair information in which Activity A1 is a source and Activity A2 is a target is set. The electronic device 101 may split and output Activity A1 on the left side on the display module and Activity A2 on the right side on the display module, based on the pair information.

For example, the electronic device 101 may determine the visibility and the lifecycle of the plurality of activities output on the display module. In FIG. 3B, the electronic device 101 may output Activity A1 and Activity A2 on the display module. The electronic device 101 may determine the lifecycle of Activity A1 and Activity A2 such that Activity A1 keeps being executed and also Activity A2 that is executed from Activity A1 is executed.

For example, a region of Activity 1 may receive a user input, such as a touch input, such that a task may execute on the region of Activity A1, and at the same time, a region of Activity A2 may receive a user input such that a task may execute on a region of Activity A2.

FIG. 3C illustrates the electronic device 101 outputting different activities respectively on the left region and the right region of the display module.

Referring to FIG. 3C, the electronic device 101 may output the different activities respectively on the left half region and the right half region of the display module. The activities output in FIG. 3C may be activities executed in the same task.

FIG. 3C illustrates the electronic device 101 splitting and outputting the plurality of activities executed in a shopping application on the display module, but is not limited to the shopping application, and the electronic device 101 may split and output the plurality of activities executed in various tasks, such as a messenger, a game, a mail, and a chatting application, on the display module.

Referring to FIGS. 3B and 3C, the electronic device 101 according to various example embodiments may output an indicator (not shown) displayed on a top of the display module, based on at least one activity output on the display module.

For example, the electronic device 101 may differently set a font color of the indicator output on the left region and the indicator output on the right region of the display module. For example, background colors of Activity A1 and Activity A2 may be different from one another. The electronic device 101 may determine the font color of the indicator output on the top of the left region of the display module, based on the background color of Activity A1, and determine the font color of the indicator output on the top of the right region of the display module, based on the background color of Activity A2.

Figure 4A:
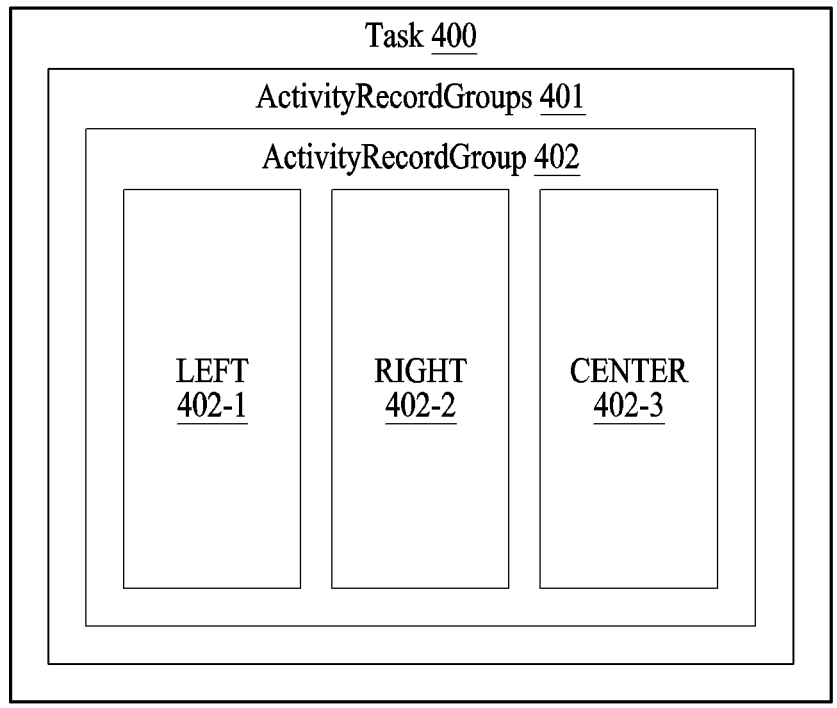
FIG. 4A illustrates an activity record group according to various example embodiments.
Figure 4B:
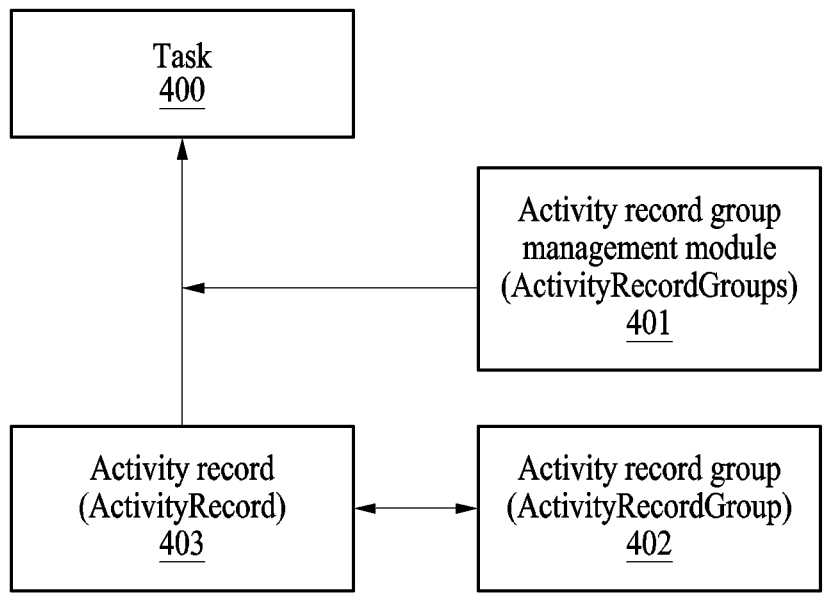
FIG. 4B illustrates a relationship among a task, activity record, activity record group, and activity record group management module according to various example embodiments.

FIGS. 4A and 4B illustrate an activity record group according to various example embodiments.

FIG. 4A illustrates an activity record group 402 according to various example embodiments. For example, the activity record group 402 (ActivityRecordGroup) may be partitioned according to regions to output the activity on a display module (e.g., the display module 160 of FIG. 1). In FIG. 4A, the activity record group 402 may be partitioned into the left region (LEFT), the center region (CENTER), and the right region (RIGHT) that are regions to output the activity on the display module. An activity record group 402-1 may output the activity on the left region of the display module. An activity record group 402-2 may output the activity on the right region of the display module, and an activity record group 402-3 may output the activity on the center region of the display module.

In FIG. 4A, the respective regions of the activity record group may be set as regions within a predetermined boundary where the activity is output on the display module. For example, the activity that is determined to be output on the display module from the activity record group 402-1 may be output on a region of the display module corresponding to the region of the activity record group 402-1.

The region to output the activity, which is set in FIG. 4A is an example, and various regions to output the activities, for example, the top left region (TOP-LEFT), the bottom left region (BOTTOM-LEFT), the top right region (TOP-RIGHT), and/or the bottom right region (BOTTOM-RIGHT), may be set.

Referring to FIG. 4A, the electronic device (e.g., the electronic device 101 of FIG. 1) according to various example embodiments may set the plurality of activities in a plurality of activity record groups 402 partitioned according to regions to output the activity on the display module, based on pair information.

For example, when the pair information in which Activity 1 is a source and Activity 2 is a target is identified, the electronic device may add Activity 1 in the activity record group 402-1 and add Activity 2 in the activity record group 402-2.

For example, the pair information may include information on the activity record groups 402 in which a source activity and a target activity are to be set, as described later. The electronic device may set the source activity and the target activity respectively in the activity record groups, by using the information on the activity record groups 402 in which the source activity and the target activity are to be set.

For example, when the plurality of activities is executed in a task 400, the electronic device may include the respective activities in the activity record groups, based on the pair information.

For example, the electronic device may set the activity which is set in the activity record group to be in another activity record group, based on the pair information. For example, the electronic device may set the activity which is set in the activity record group 402-1 to be in the activity record group 402-2. That is, the electronic device may change the activity record groups 402 of the activities, based on the pair information.

An activity record group management module 401 according to various example embodiments may manage the plurality of activity record groups 402. For example, the activity record group management module 401 may control each of the activity record groups 402 to independently have a visibility and a lifecycle. For example, a single activity record group management module 401 may be defined in a single task 400.

The electronic device according to various example embodiments may apply a policy to each of the plurality of activity record groups 402. For example, the activity record group management module 401 may apply the policy to each of the activity record groups 402 to control each of the activity record groups 402 to independently have the visibility and the lifecycle.

For example, the policy applied to each of the activity record groups 402 may correspond to "Visibility policy", "Activity lifecycle policy", "Configuration propagation", "Ordering policy", "Clear activities policy", "Focus window with key event dispatch", "Cases that effect app boundary, such as resolution change", and "Define metadata for a feature configuration". Policies and logic that implements policies and related actions can be, for example, incorporated in the OS 142 and/or middleware 144 of FIG. 1 and may be embodied in instructions executable by the processor 120 and stored in memory 130 of FIG. 1 as computer-readable instructions on a non-transitory storage medium.

For example, "Visibility policy" may correspond to logic that manages the visibility of the activities by z-order in the activity record groups. The electronic device may restrict an activity record from moving between activity record group and update an activity (behindFullscreen) that is not output on the display module to calculate the visibility.

For example, "Activity lifecycle policy" may correspond to logic that manages the visibility and the lifecycle by z-order in the activity record groups. The electronic device may apply the "Activity lifecycle policy" to each of the active record groups such that the plurality of activities is in an operational state (multi-resume) in the task 400.

For example, "Configuration propagation" may be a policy that sets a value of boundary of the activity record group to be a value of boundary of a window configuration (WindowConfiguration) of the activity record.

For example, "Ordering policy" may be a policy required for an ordering sync of Task.mChildren and ActivityRecordGroup.mChildren.

For example, "Activity clear policy" may correspond to logic that removes the activity executed from a finished activity when the activity executed intermediately is finished after the plurality of activities is executed. For example, when the activities are executed in order of Activity A1, Activity A2, Activity A3, and Activity A4, and Activity A2 is finished, Activity A3 executed from Activity A2 and Activity A4 executed from Activity A3 may be removed together.

For example, "Focus window with key event dispatch" may be a policy that moves a focus window according to an activity of finally receiving an input and dispatches the input (key event). For example, the input may be a touch activity that is input on a touch module of the display. For example, the focus window policy may include logic that determines a next focus window when the focus window is finished.

For example, "Cases that effect app boundary", such as resolution change, may correspond to logic that processes a circumstance on a case that the value of boundary of the activity record group is changed. For example, when a resolution of the display changes, the value of boundary of the activity record group may change and the activity record may configure a screen to meet the changed value of boundary.

For example, "Define metadata for a feature configuration" may correspond to a policy required for an object for defining metadata for a feature configuration that outputs the plurality of activities on the display module, and parsing and managing the configuration. The feature for defining and supporting the metadata may be selected.

The activity record group management module 401 according to various example embodiments may generate the activity record groups 402.

The electronic device according to various example embodiments may determine the activity to be output on the display from the plurality of activity record groups 402. For example, the electronic device may determine the activity to be output on the display module by using the pair information. For example, the pair information may include information on the activity record group 402 to record the activity corresponding to a source, and the activity record group 402 to record the activity corresponding to a target.

For example, when Activity 2 is executed from Activity 1, and Activity 3 is executed from Activity 2, the electronic device may identify the pair information in which Activity 1 is a source and Activity 2 is a target and the pair information in which Activity 2 is a source and Activity 3 is a target. The electronic device may use the pair information to set Activity 1 in the activity record group 402-1 and set Activity 2 and Activity 3 in the activity record group 402-2. The electronic device may determine the activity to be output on the display module from the activity record group 402-1 to be Activity 1, and the activity to be output on the display module from the activity record group 402-2 to be Activity 3.

For example, when Activity 2 is executed from Activity 1, and Activity 3 is executed from Activity 2, the electronic device may identify the pair information in which Activity 1 is a source and Activity 2 is a target, and the pair information in which Activity 2 is a source and Activity 3 is a target. The electronic device may use the pair information to set Activity 1 and Activity 2 in the activity record group 402-1 and set Activity 3 in the activity record group 402-2. The electronic device may determine the activity to be output on the display module from the activity record group 402-1 to be Activity 2, and the activity to be output on the display module from the activity record group 402-2 to be Activity 3.

FIG. 4B illustrates a relationship among the task 400, the activity record 403, the activity record group 402, and the activity record group management module 401 according to various example embodiments.

Referring to FIG. 4B, the activity record 403 (ActivityRecord) according to various example embodiments may include information on the activities executed in the task 400. The electronic device may output one or more activities on the display module by using information on the activities included in the activity record 403.

For example, the information included in the activity record 403 may include an activity state (ActivityState), a visibility, the activity group (ActivityGroup), a source activity (SourceActivity), and a target activity (TargetActivities).

For example, the activity state (ActivityState) may be information that is a basis of the lifecycle of the activity and may correspond to information on a current state of the activity, for example, a state (resumed) in which the activity is displayed, a state (stopped) in which the activity is hidden by another activity, and a state (finishing) in which the activity is being finished.

For example, the visibility may correspond to information on whether the activity is displayed on a screen, that is, whether the activity is output on the display module. To output the plurality of activities on the display module, each of the plurality of activity record groups 402 may manage the visibility of the activities.

For example, the activity group (ActivityGroup) may correspond to information on the activity record group 402 to which the corresponding activity belongs. For example, when Activity 1 is set in the activity record group 402-1 of FIG. 4A, the activity group of Activity 1 may be the activity record group 402-1.

For example, the source activity (SourceActivity) may correspond to information on an activity to be a source of the corresponding activity. For example, when Activity 2 is executed from Activity 1, the source activity of Activity 2 may be Activity 1.

For example, the target activity (TargetActivities) may correspond to information on another activity to be a target of the corresponding activity. For example, when Activity 2 is executed from Activity 1, the target activity of Activity 1 may be Activity 2.

To sum up the above-described descriptions provided for the activity record 403, the activities executed while the task 400 executes may be recorded in the activity record 403. Each activity recorded in the activity record 403 may include information on the activity state, the visibility, the activity group, the source activity, and the target activity.

The information on the activity included in the activity record 403 according to various example embodiments may be determined according to the information on the activity included in the activity record groups 402. For example, the electronic device may determine the visibility and the lifecycle of Activity 1 set in the activity record group 402-1. The information on Activity 1 included in the activity record 403 may be determined according to the information on Activity 1 set in the activity record group 402-1.

The electronic device according to various example embodiments may output the plurality of activities on the display module, based on the activity record 403. The electronic device may output the plurality of activities on the display module according to the activity state and the visibility of the activity included in the activity record 403.

For example, the electronic device may output, on the display module, the activity that is in the activity state (resumed) in which the activity is displayed and in a state in which the visibility is output on the display module, by using the information on the activity included in the activity record 403.

For example, the electronic device may output the activity on the region of the display module corresponding to the region of the activity record group to which the activity belongs, by using the information on the activity group (ActivityGroup) of the activity to be output on the display module.

Figure 5:
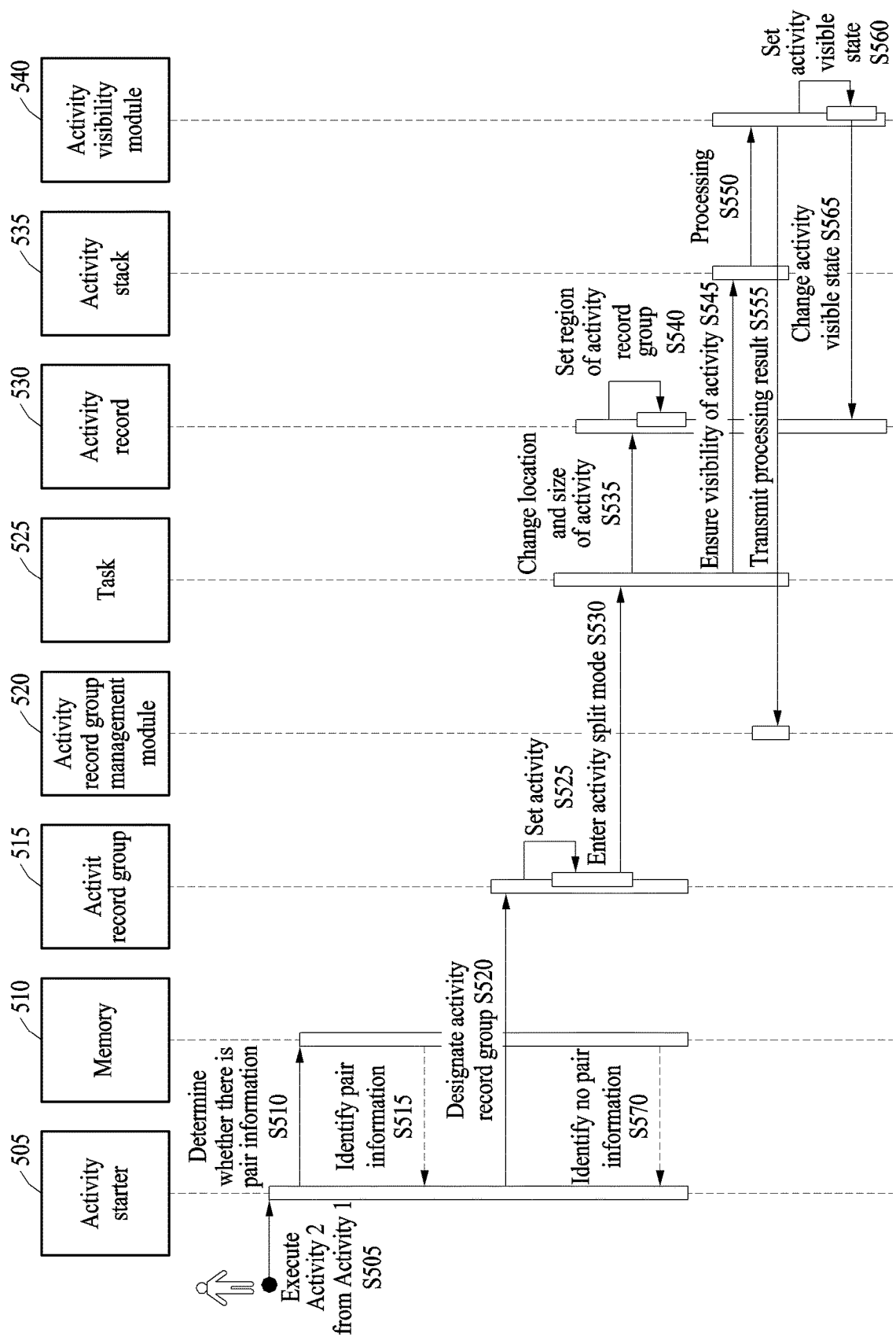
FIG. 5 illustrates an operation of an electronic device according to various example embodiments.

FIG. 5 illustrates an operation of an electronic device (e.g., the electronic device 101 of FIG. 1) according to various example embodiments.

In operation S505, the electronic device according to various example embodiments may execute Activity 2 from Activity 1. In operation S505, the electronic device may identify a plurality of activities executed in the same task. For example, the electronic device may identify the plurality of activities in an activity starter 505 (ActivityStarter).

In operation S510, the electronic device according to various example embodiments may determine whether there is pair information. For example, a request to identify whether the pair information defined between the plurality of activities of the electronic device is stored may be sent from the activity starter 505 (ActivityStarter) to a memory 510 (e.g., the memory 130 of FIG. 1, or a repository).

In operation S515, the electronic device according to various example embodiments may identify the pair information defined between the plurality of activities. For example, the activity starter 505 (ActivityStarter) may identify the pair information defined between the plurality of activities stored in the memory 510.

In operation S520, the electronic device according to various example embodiments may set activity record groups 515 (e.g., the activity record groups 402 of FIGS. 4A, 4B) for the plurality of activities. For example, the activity starter 505 of the electronic device may designate the activity record groups 515 such that each of the plurality of activities belongs to a predetermined activity record group 515, based on the pair information.

In operation S525, the electronic device according to various example embodiments may set (addChild) the activity in each of the activity record groups 515.

In operation S530, the electronic device according to various example embodiments may enter (enterSplitActivityMode) an activity split mode. For example, the entering of the activity split mode may be a request to update information on the location, the size, and the visibility of the activity output on the display module, in an activity record group unit. For example, the activity record groups 515 may send a task 525 (e.g., the task 400 of FIGS. 4A, 4B) a request to enter the activity split mode.

In operation S535, the electronic device according to various example embodiments may change the location and the size of the activity. For example, the changing of the location and the size of the activity may be ensuring (ensureActivityConfiguration) of the location and the size of the plurality of activities to be output on the display module. For example, the task 525 may send an activity record 530 a request to change the location and the size of the activity to meet the activity record groups 515 to which the activities respectively belong.

In operation S540, the electronic device according to various example embodiments may set (setGroupBounds) the region of the activity record groups 515. For example, the electronic device may set the location and the size of the activity for the activities recorded in the activity record 530, according to a value of regions (or a value of boundary) of the activity record groups 515 to which the activities respectively belong.

In operation S545, the electronic device according to various example embodiments may ensure (ensureActivityVisible) the visibility of the activity. For example, the task 525 may send an activity stack 535 (ActivityStack) a request to ensure the visibility of the plurality of activities output on the display module.

In operation S550, the electronic device according to various example embodiments may process the request to ensure the visibility of the activities. For example, an activity visibility module 540 (EnsureActivityVisibleHelper) may process the request, from the activity stack 535, to ensure the visibility of the plurality of activities output on the display module.

In operation S555, the electronic device according to various example embodiments may send a result of processing the request to ensure the visibility of the plurality of activities output on the display module. For example, the result of processing the request in operation S545 may be sent from the activity visibility module 540 to an activity record group management module 520 (e.g., the activity record group management module 401 (ActivityRecordGroups) of FIGS. 4A, 4B).

For example, the electronic device may determine the visibility and the lifecycle, in a activity record group 515 unit, by using the result of processing the request to ensure the visibility of the plurality of activities. For example, the activity record group management module 520 may determine the visibility and the lifecycle in each of the plurality of activity record groups.

In operation S560, the electronic device according to various example embodiments may set (setActivityVisibilityStateInSplitActivityMode) a visible state of the activity. In operation S565, the electronic device may change (makeVisibleifNeeded) the visible state of the activity according to the set visible state of the activity. For example, the electronic device may send a request to change the visible state of the activity to the activity record 530 such that the visible state of the activity recorded in the activity record 530 may be changed.

In operation S570, the electronic device according to various example embodiments may identify that there is no pair information defined between the plurality of activities. For example, when the pair information defined between Activity 1 and Activity 2 is not identified, the electronic device may output Activity 2 on the display module.

Figure 6:
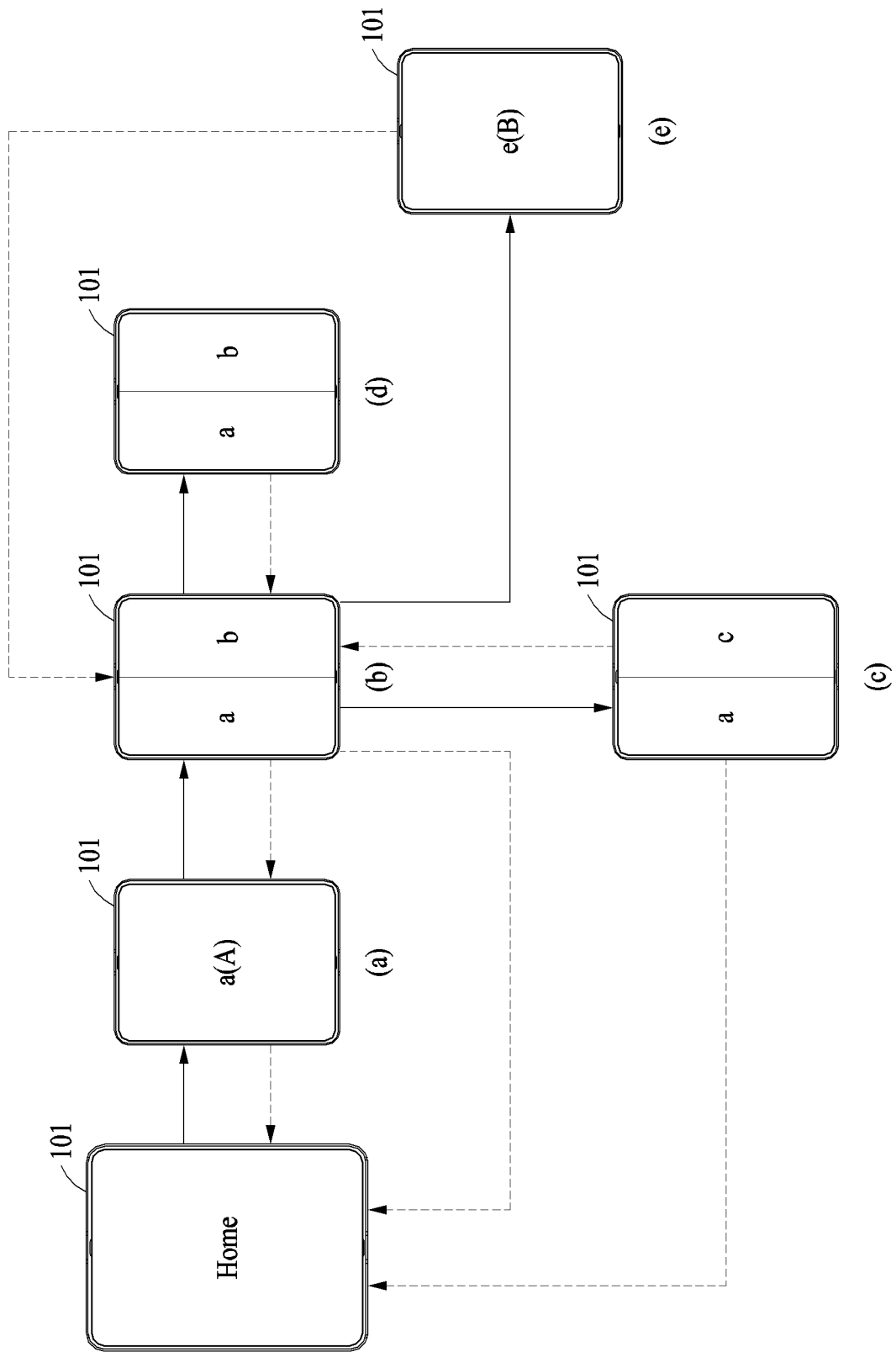
FIG. 6 illustrates an activity output on a display module according to various example embodiments.

FIG. 6 illustrates an activity output on a display module (e.g., the display module 160 of FIG. 1) according to various example embodiments.

When Task A is executed from an initial screen (Home) of the electronic device 101, Activity a may be output on an entire display module, as illustrated in (a) of FIG. 6. When an operation of cancelling or finishing Activity a is executed from Activity a, the initial screen of the electronic device 101 may be output.

For example, when Activity b is executed from Activity a, Activity a may be output on the left region of the display module and Activity b may be output on the right region of the display module, as illustrated in (b) of FIG. 6. For example, when an operation of cancelling or finishing Activity b is executed on a display region on which Activity b is output, Activity a may be output, as illustrated in (a) of FIG. 6.

For example, when Activity c is executed from Activity a in (b) of FIG. 6, Activity a may be output on the left region of the display module and Activity c may be output on the right region of the display module, as illustrated in (c) of FIG. 6. For example, when an operation of cancelling or finishing Activity c is executed on a display region on which Activity c is output, Activity a and Activity b may be output, as illustrated in (b) of FIG. 6.

For example, when Activity d is executed from Activity b in (b) of FIG. 6, Activity a may be output on the left region of the display module and Activity d may be output on the right region of the display module, as illustrated in (d) of FIG. 6. For example, when an operation of cancelling or finishing Activity d is executed on a display region on which Activity d is output, Activity a and Activity b may be output, as illustrated in (b) of FIG. 6.

For example, when Task B is executed in (b) of FIG. 6, Activity e may be displayed on the entire display module. For example, when an operation of cancelling or finishing Activity e is executed on a display region on which Activity e is output, Activity a and Activity b may be output, as illustrated in (b) of FIG. 6.

For example, in FIG. 6, when a plurality of activities is executed, Activity a may be output on the left region of the display module and Activity b, Activity c, and Activity d may be output on the right region of the display module.

For example, pair information defined between Activity a, Activity b, Activity c, and Activity d may be set to output Activity a on the left region of the display module.

For example, in (b), (c), and (d) of FIG. 6, when an operation of cancelling or finishing Activity a is executed on a display region on which Activity a is output, the initial screen of the electronic device 101 may be output.

Figure 7A:
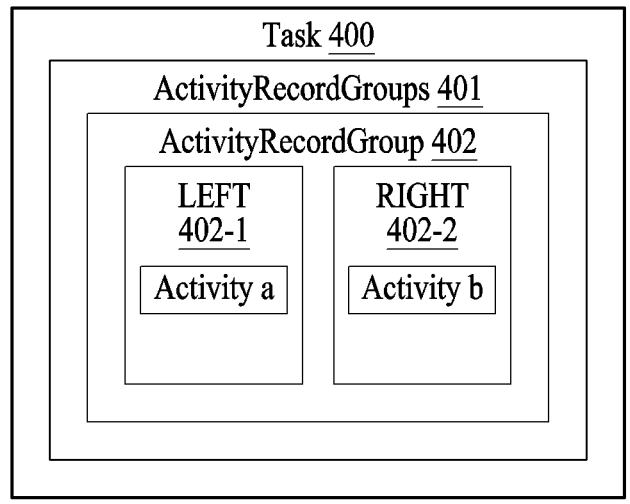
FIGS. 7A, 7B, and 7C illustrate an activity record group, and an activity set in an activity record group according to various example embodiments.
Figure 7B:
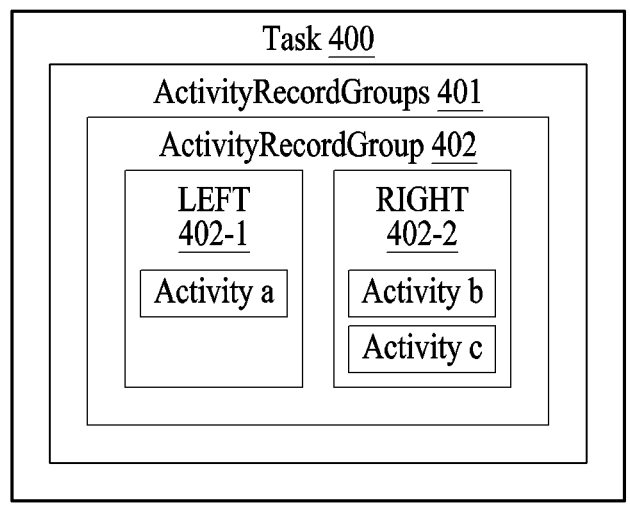
Figure 7C:
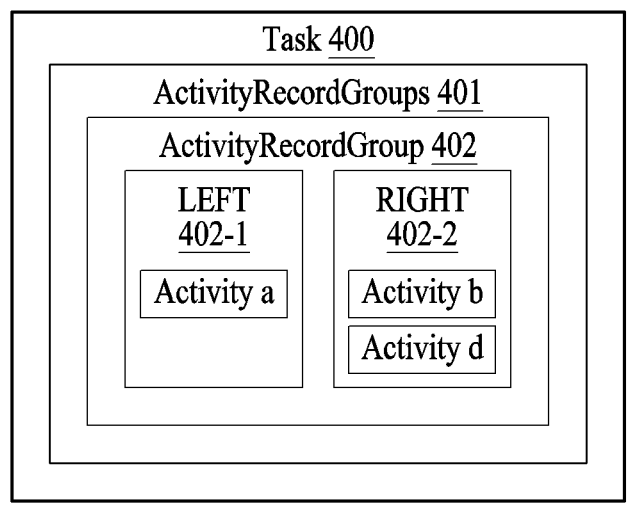

FIGS. 7A, 7B, and 7C illustrate an activity record group, and an activity set in the activity record group according to various example embodiments. In FIGS. 7A-7C, the activity record group 402-1 indicates that a region output on a display module is the left region (LEFT), and the activity record group 402-2 indicates that a region output on a display module is the right region (RIGHT).

FIGS. 7A, 7B, and 7C illustrate activities set in the activity record group 402 in (b), (c), and (d) of FIG. 6.

For example, in FIG. 7A, Activity a may be set in the activity record group 402-1, and Activity b may be set in the activity record group 402-2. For example, an electronic device (e.g., the electronic device 101 of FIG. 1) may set Activity a and Activity b respectively in the activity record groups 402-1 and 402-2, based on pair information.

For example, in FIG. 7A, the electronic device may determine activities to be output on the display module in each of the activity record groups 402-1 and 402-2. For example, in FIG. 7A, the activity to be output on the display module in the activity record group 402-1 may be determined to be Activity a, and the activity to be output on the display module in the activity record group 402-2 may be determined to be Activity b.

For example, in FIG. 7B, Activity a may be set in the activity record group 402-1 and Activity b and Activity c may be set in the activity record group 402-2. For example, the electronic device may set Activity c executed from Activity a in the activity record group 402-2, based on the pair information defined between Activity a and Activity c.

In FIG. 7B, the electronic device may determine the activity to be output on the display module in the activity record group 402-1 to be Activity a, and the activity to be output on the display module in the activity record group 402-2 to be Activity c.

For example, in FIG. 7C, Activity a may be set in the activity record group 402-1 and Activity b and Activity d may be set in the activity record group 402-2. For example, the electronic device may set Activity d executed from Activity b in the activity record group 402-2, based on the pair information defined between Activity b and Activity d.

In FIG. 7C, the electronic device may determine the activity to be output on the display module in the activity record group 402-1 to be Activity a, and the activity to be output on the display module in the activity record group 402-2 to be Activity d.

Figure 8:
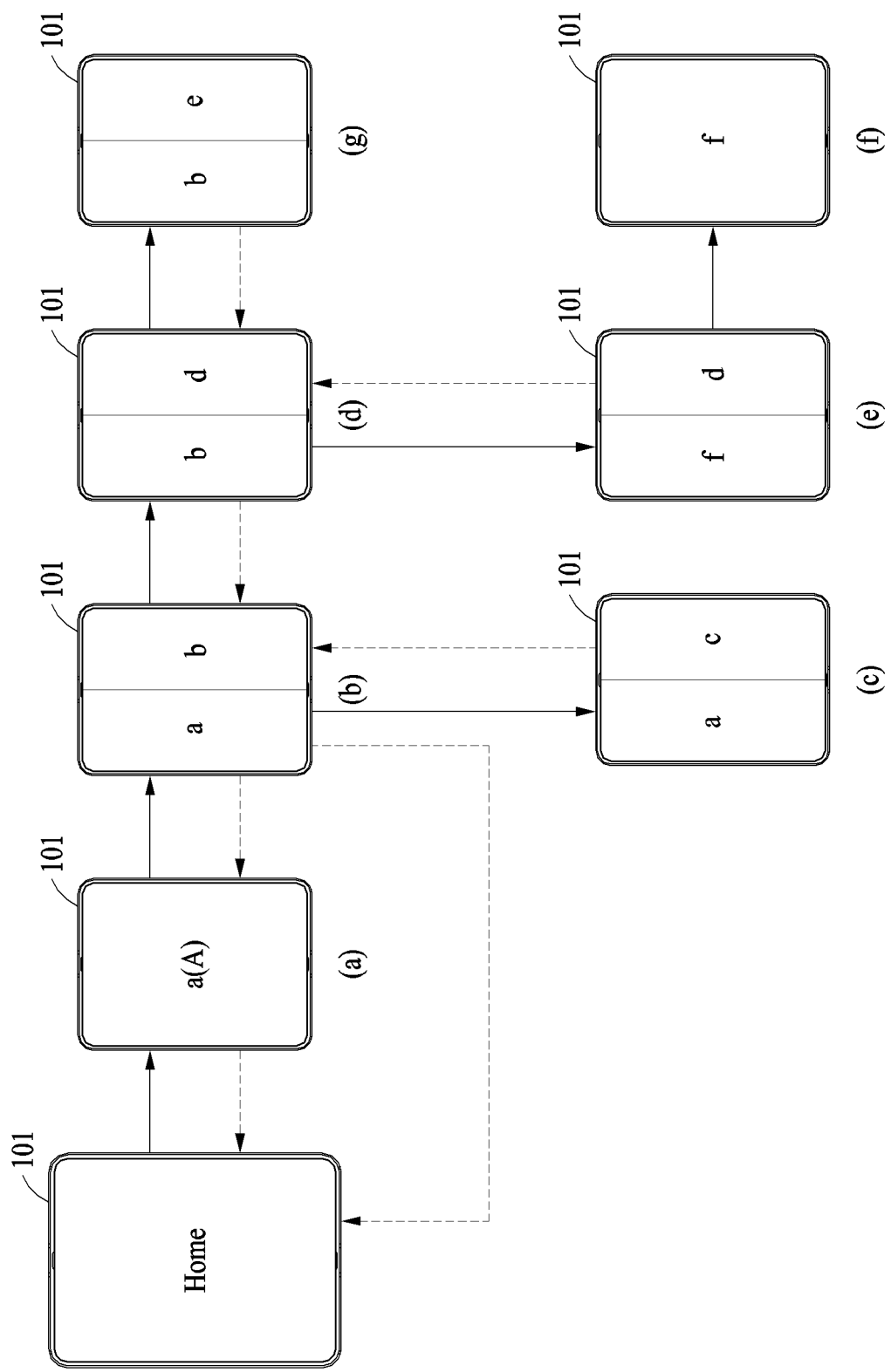
FIG. 8 illustrates an activity output on a display module according to various example embodiments.

FIG. 8 illustrates an activity output on a display module according to various example embodiments.

When Task A is executed on an initial screen (Home) of the electronic device 101, Activity a may be output on an entire display module, as illustrated in (a) of FIG. 8. When an operation of cancelling or finishing Activity a is executed from Activity a, the initial screen of the electronic device may be output.

For example, when Activity b is executed from Activity a, Activity a may be output on the left region of the display module and Activity b may be output on the right region of the display module, as illustrated in (b) of FIG. 8. For example, when an operation of cancelling or finishing Activity b is executed on a display region on which Activity b is output, Activity a may be output, as illustrated in (a) of FIG. 8. For example, when an operation of cancelling or finishing Activity a is executed on a display region on which Activity a is output, the initial screen of the electronic device may be output.

For example, when Activity c is executed from Activity a in (b) of FIG. 8, Activity a may be output on the left region of the display module and Activity c may be output on the right region of the display module, as illustrated in (c) of FIG. 8. For example, when an operation of cancelling or finishing Activity c is executed on a display region on which Activity c is output, Activity a and Activity b may be output, as illustrated in (b) of FIG. 8.

For example, when Activity d is executed from Activity b in (b) of FIG. 8, Activity b may be output on the left region of the display module and Activity d may be output on the right region of the display module, as illustrated in (d) of FIG. 8. For example, when an operation of cancelling or finishing Activity d is executed on a display region on which Activity d is output, Activity a and Activity b may be output, as illustrated in (b) of FIG. 8. For example, when an operation of cancelling or finishing Activity b is executed on a display region on which Activity b is output, Activity a may be output, as illustrated in (a) of FIG. 8.

For example, when Activity f is executed from Activity b in (d) of FIG. 8, Activity f may be output on the left region of the display module and Activity d may be output on the right region of the display module, as illustrated in (e) of FIG. 8. For example, when an operation of cancelling or finishing Activity f is executed on a display region on which Activity f is output, Activity b and Activity d may be output, as illustrated in (d) of FIG. 8. For example, when an operation of cancelling or finishing Activity d is executed on a display region on which Activity d is output, Activity f may be output, as illustrated in (f) of FIG. 8.

For example, when Activity e is executed from Activity b in (d) of FIG. 8, Activity b may be output on the left region of the display module and Activity e may be output on the right region of the display module, as illustrated in (g) of FIG. 8. For example, when an operation of cancelling or finishing Activity e is executed on a display region on which Activity e is output, Activity b and Activity d may be output, as illustrated in (d) of FIG. 8. For example, when an operation of cancelling or finishing Activity b is executed on a display region on which Activity b is output, Activity a may be output, as illustrated in (a) of FIG. 8.

FIGS. 9A, 9B, 9C, 9D, 9E, and 9F illustrate an activity record group 402, and an activity set in an activity record group according to various example embodiments.

In FIGS. 9A-9F, the activity record group 402-1 indicates that a region to be output on a display module is the left region (LEFT), and the activity record group 402-2 indicates that a region to be output on a display module is the right region (RIGHT).

FIGS. 9A, 9B, 9C, 9D, 9E, and 9F respectively illustrate activities set in the activity record groups in (b), (c), (d), (e), (f), and (g) of FIG. 8.

Figure 9A:
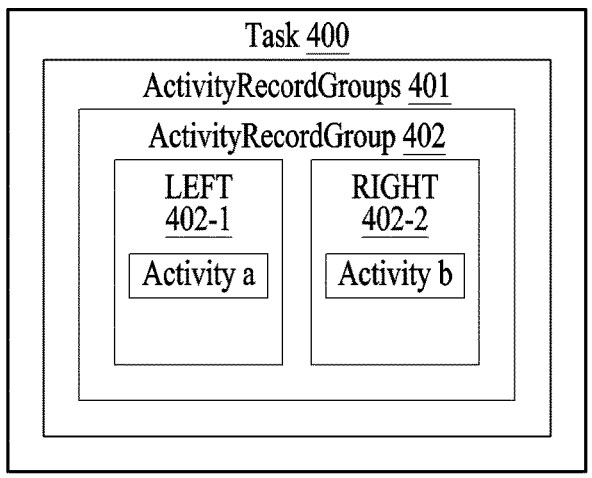
FIGS. 9A, 9B, 9C, 9D, 9E, and 9F illustrate an activity record group, and an activity set in an activity record group according to various example embodiments.

For example, in FIG. 9A, Activity a may be set in the activity record group 402-1, and Activity b may be set in the activity record group 402-2. For example, an electronic device may set Activity a and Activity b respectively in the activity record groups 402-1 and 402-2, based on pair information.

For example, the electronic device may determine activities to be output on the display module respectively in the activity record groups 402-1 and 402-2. For example, in FIG. 9A, the electronic device may determine the activity to be output on the display module in the activity record group 402-1 to be Activity a and the activity to be output on the display module in the activity record group 402-2 to be Activity b.

Figure 9B:
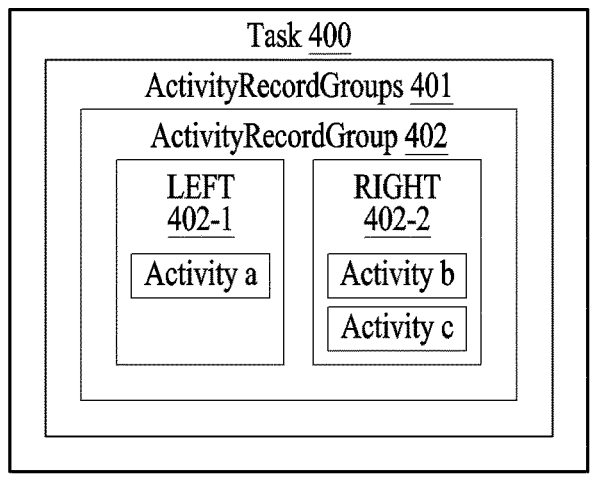

For example, in FIG. 9B, Activity a may be set in the activity record group 402-1 and Activity b and Activity c may be set in the activity record group 402-2. For example, the electronic device may set Activity c executed from Activity a in the activity record group 402-2, based on the pair information defined between Activity a and Activity c.

In FIG. 9B, the electronic device may determine the activity to be output on the display module in the activity record group 402-1 to be Activity a, and the activity to be output on the display module in the activity record group 402-2 to be Activity c.

Figure 9C:
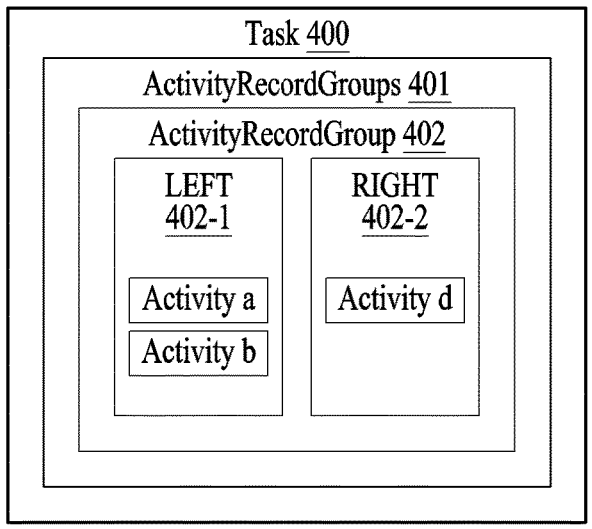

For example, in FIG. 9C, Activity a and Activity b may be set in the activity record group 402-1 and Activity d may be set in the activity record group 402-2. For example, the electronic device may change the activity record group to which the activity belongs, based on the pair information. In FIG. 9C, the electronic device may change the activity record group 402-2 to which Activity b previously belonged in FIG. 9A into the other activity record group 402-1, based on the pair information defined between Activity b and Activity d, and set Activity d executed from Activity b in the activity record group 402-2.

In FIG. 9C, the electronic device may determine the activity to be output on the display module in the activity record group 402-1 to be Activity b and the activity to be output on the display module in the activity record group 402-2 to be Activity d.

Figure 9D:
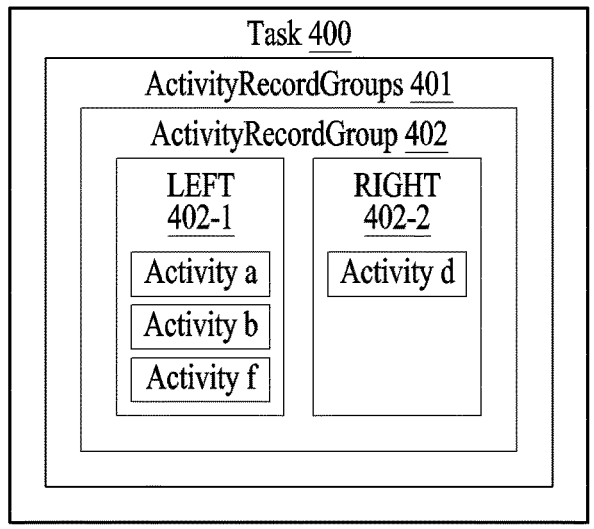

For example, in FIG. 9D, Activity a, Activity b, and Activity f may be set in the activity record group 402-1 and Activity d may be set in the activity record group 402-2. For example, the electronic device may set Activity f executed from Activity b in the activity record group 402-1, based on the pair information defined between Activity b and Activity f.

In FIG. 9D the electronic device may determine the activity to be output on the display module in the activity record group 402-1 to be Activity f, and the activity to be output on the display module in the activity record group 402-2 to be Activity d.

Figure 9E:
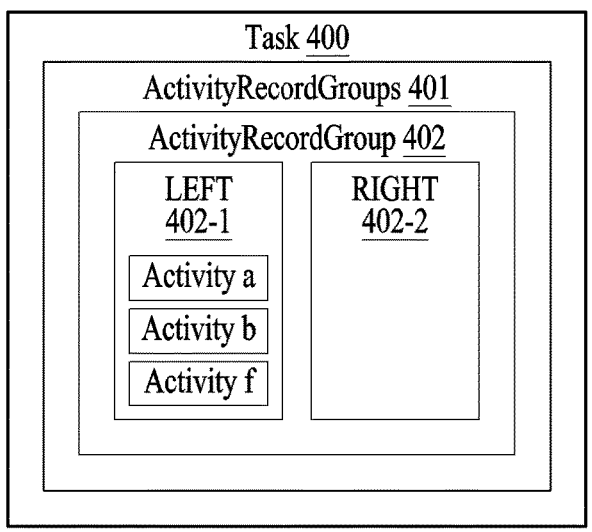

For example, in FIG. 9E, Activity a, Activity b, and Activity f may be set in the activity record group 402-1. Activity d may be finished and excluded from the activity record group 402-2.

In FIG. 9E, the electronic device may determine the activity to be output on the display module in the activity record group 402-1 to be Activity f. Since there is no activity set in the activity record group 402-2, the electronic device may output Activity f on an entire display module.

Figure 9F:
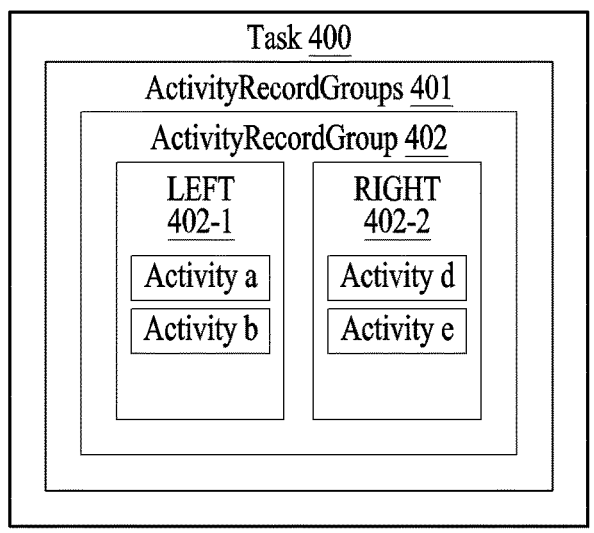

For example, in FIG. 9F, Activity a and Activity b may be set in the activity record group 402-1 and Activity d and Activity e may be set in the activity record group 402-2. For example, the electronic device may set Activity e executed from Activity b in the activity record group 402-2, based on the pair information defined between Activity b and Activity e.

In FIG. 9F, the electronic device may determine the activity to be output on the display module in the activity record group 402-1 to be Activity b and the activity to be output on the display module in the activity record group 402-2 to be Activity e.

As described with reference to FIGS. 6 through 9F, the lifecycle of the activities set in the activity record groups 402-1 and 402-2 may be ensured. The electronic device may determine information on an activity state of the activities included in the activity record groups 402-1 and 402-2, for example, a state (resumed) in which the activity is output on the display module, a state (stopped) in which the activity is hidden by another activity, and a state (finishing) in which the activity is being finished, and accordingly, the lifecycle may be ensured even for the activity that is not output on the display module, such as the activity that is in a state in which the activity is hidden by another activity.

For example, the electronic device may determine the visibility of the activities included in the activity record groups 402-1 and 402-2. The electronic device may determine the visibility of the activities respectively for the plurality of activity record groups 402-1 and 402-2, and accordingly, the plurality of activities may be output on the display module, as described with reference to FIGS. 6 through 9F.

For example, in FIG. 7C, the electronic device may determine the activity to be output on the display module in the activity record group 402-1 to be Activity a, and the activity to be output on the display module in the activity record group 402-2 to be Activity d. Among Activity a, Activity b, and Activity d recorded in the activity record, Activity a and Activity d may be determined to be in a state (resumed) in which the activity is output on the display module, and Activity b may be determined to be a state (stopped) in which the activity is hidden by another activity. The size and the location of Activity a and Activity d output on the display module may be determined according to a value of boundary of the activity record groups 402-1 and 402-2 to which the activities respectively belong.

Referring to FIGS. 6 through 9F, the electronic device according to various example embodiments may determine the activity record group in which the plurality of activities are to be set, based on the pair information. For example, the pair information may include information on the activity record group in which the source activity and the target activity are to be set.

For example, (d) of FIG. 6 and (d) of FIG. 8 indicate an activity to be output on the display by the electronic device when Activity b is executed from Activity a and Activity d is executed from Activity b. In (d) of FIG. 6, the electronic device may output Activity a and Activity d, but in (d) of FIG. 8, the electronic device may output Activity b and Activity d.

FIG. 7C and FIG. 9C respectively illustrate the activities set in the activity record group in (d) of FIG. 6 and (d) of FIG. 8. In FIG. 7C, Activity a may be set in the activity record group 402-1 and Activity b and Activity d may be set in the activity record group 402-2. In contrast, in FIG. 9C, Activity a and Activity b may be set in the activity record group 402-1 and Activity d may be set in the activity record group 402-2.

In the above examples, even though the same activity is executed in the same order, the activity record groups 402 in which the plurality of activities are set based on the pair information may vary. For example, in the pair information on Activity b and Activity d in (c) of FIG. 6, Activity b and Activity d may be defined to be set in the activity record group 402-2. In the pair information on Activity b and Activity d in (c) of FIG. 8, Activity b may be defined to be set in the activity record group 402-1 and Activity d may be defined to be set in the activity record group 402-2.

Figure 10A:
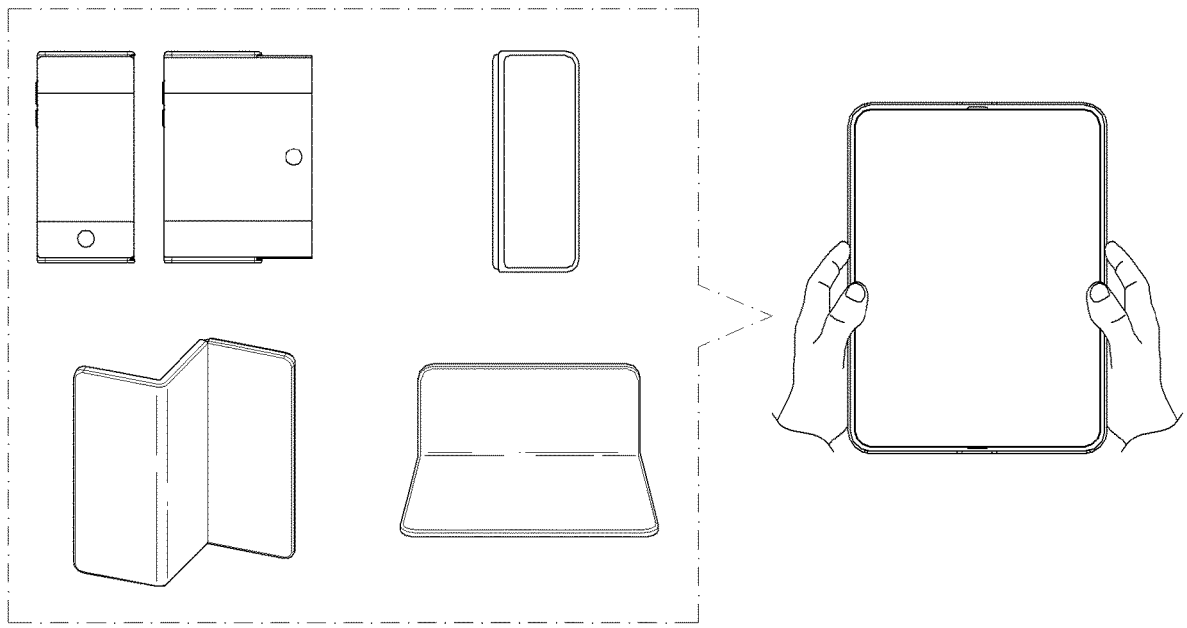
FIGS. 10A and 10B illustrate form factors of an electronic device according to various example embodiments.
Figure 10B:
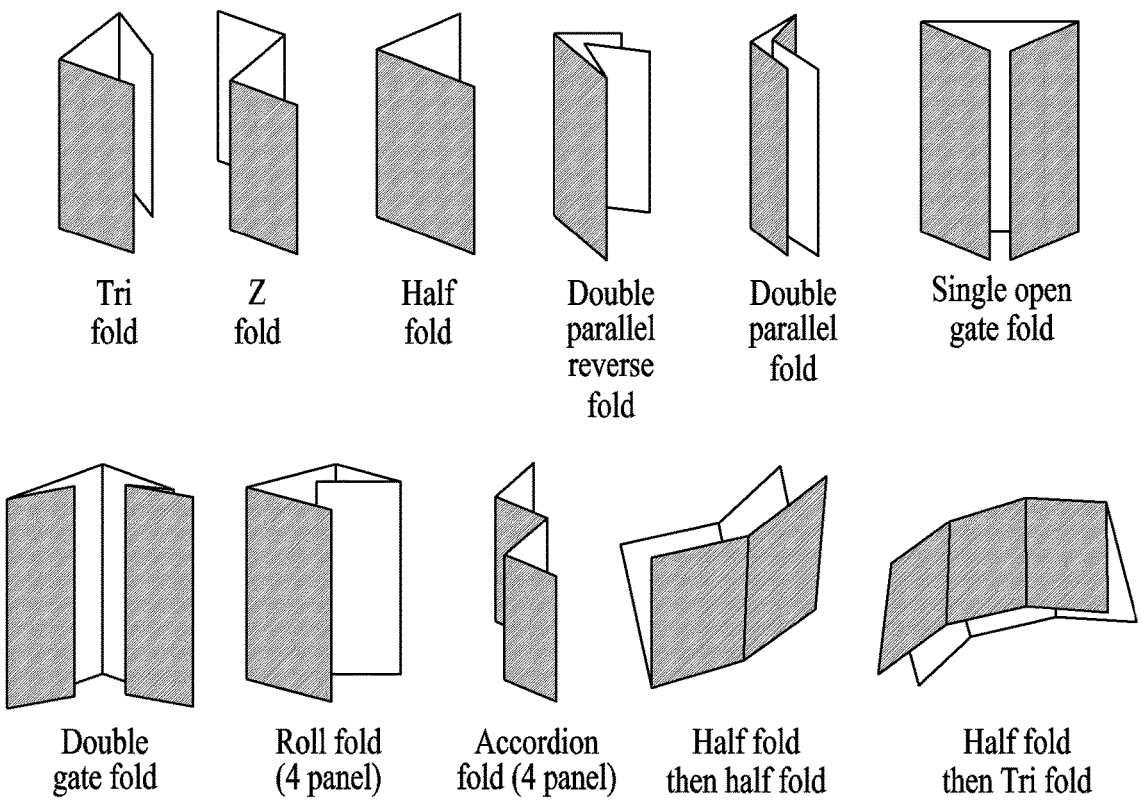

FIGS. 10A and 10B illustrate form factors of an electronic device according to various example embodiments.

According to various example embodiments, form factors of an electronic device may be various form factors, such as a slidable-type, a rollable-type, a folding-type, and a flex-type.

The electronic device (e.g., electronic device 101 of FIG. 1) according to various example embodiments may identify an output region capable of outputting a plurality of activities according to information regarding a display module and a state of the display module.

For example, an electronic device of a slidable-type or a rollable-type may identify the output region according to an expanded state of the display module by using information regarding the display module. For example, an electronic device of a folding-type or a flex-type may identify the output region according to a folded state or an unfolded state of the display module by using the information regarding the display module.

FIG. 10B illustrates form factors of the electronic device according to various example embodiments. For example, the electronic device may identify the folded state or the unfolded state of the display module by using the information regarding the display module to identify the output region capable of outputting the plurality of activities.

An electronic device of a folding-type may use various types of form factors, such as Tri Fold, Z Fold, Half Fold, Double Parallel Reverse Fold, Double Parallel Fold, Single Open Gate Fold, Double Gate Fold, Roll Fold (4 Panel), Accordion Fold (4 Panel), Half Fold then Half Fold, and Half Fold then Tri Fold, illustrated in FIG. 10B.

FIGS. 11A, 11B, 11C, 12, 13, and 14 illustrate a plurality of activities output on a display module based on a form factor of an electronic device (e.g., electronic device 101 of FIG. 1) according to various example embodiments.

Referring to FIGS. 11A through 14, the electronic device according to various example embodiments may output one or more activities on a display module, based on an output region.

FIGS. 11A, 11B, and 11C illustrate an activity output on the electronic device including a display module of a rollable-type or a slidable-type.

FIG. 11A illustrates a state in which Activity A1 is output on the display module from a display module 160a that is in a basic state, which is not expanded.

Referring to FIG. 11B, the electronic device according to various example embodiments may output one or more activities on the display module according to a change in the output region. FIG. 11B illustrates a display module 160b that is in an expanded state in FIG. 11A. The electronic device may output Activity A1 on the left region of the display module 160b that is expanded, and output Activity A2 on the right region of the display module 160b that is expanded.

Referring to FIG. 11C, the electronic device may change the activity set in an activity record group according to a change in the output region. FIG. 11C illustrates a display module 160c that is in an expanded state in FIG. 11B.

In FIG. 11B, the activity record group corresponding to the left region of the display module may include Activity A1 and the activity record group corresponding to the right region of the display module may include Activity A2.

For example, in FIG. 11C, Activity A2 may be set in the activity record group that is different from the activity record group in FIG. 11B. For example, in FIG. 11C, Activity A2 may be set in the activity record group corresponding to the top right of the display module 160c that is expanded. As the display module 160 expands, the electronic device may identify the change in the output region and set Activity A2 to be included in the other activity record group.

In other words, in addition to a case in which a new activity is executed from existing activities that are executing, the electronic device may change the activity record group of the plurality of activities, based on the change in the output region due to a state change of the display module 160 according to expansion, reduction, unfolding, and folding. For example, the electronic device may output one or more activities on the display module 160, based on the change in the output region.

For example, the electronic device may change information on the activities included in the activity record, based on the change in the output region. The electronic device may determine the visibility and the lifecycle of the activities included in the activity record group as the output region of the display module changes. When the visibility and the lifecycle of the activities included in the activity record group change, the electronic device may determine the information on the activities included in the activity record.

For example, in FIG. 11B, a region of Activity A2 included in the activity record may correspond to the right region (or the center region), and the activity record group to which Activity A2 belongs may correspond to the activity record group corresponding to the right region of the display module. In FIG. 11C illustrating the change in the output region of the display module, the region of Activity A2 included in the activity record may correspond to the top right region, and the activity record group to which Activity A2 belongs may correspond to the activity record group corresponding to the top right region of the display module.

For example, in FIG. 11B, an activity state of Activity A3 included in the activity record may be a state (stopped) in which the activity is hidden by another activity, and in FIG. 11C, an activity state of Activity A3 may be a state (resumed) in which the activity is output on the display module.

In other words, as the output region of the display module expands, the electronic device may change the information on the activities, for example, the visibility, the lifecycle, and the region of Activity A2 and Activity A3.

In FIG. 11C, the electronic device may output Activity A1 on the left region of the display module 160c that is expanded, output Activity A2 on the top right region of the display module 160c that is expanded, and output Activity A3 on the bottom right region of the display module 160c that is expanded. Activity A3 may be the one that is set in the activity record group corresponding to the bottom right region of the expanded display module.

For example, a value of boundary of the activity record group may be determined based on information on the display module. For example, in FIGS. 11A-11C, values of boundary of the activity record groups corresponding to the left region, right region, top right region, and bottom right region of the display module may be determined according to the size of the display module.

Figure 12:
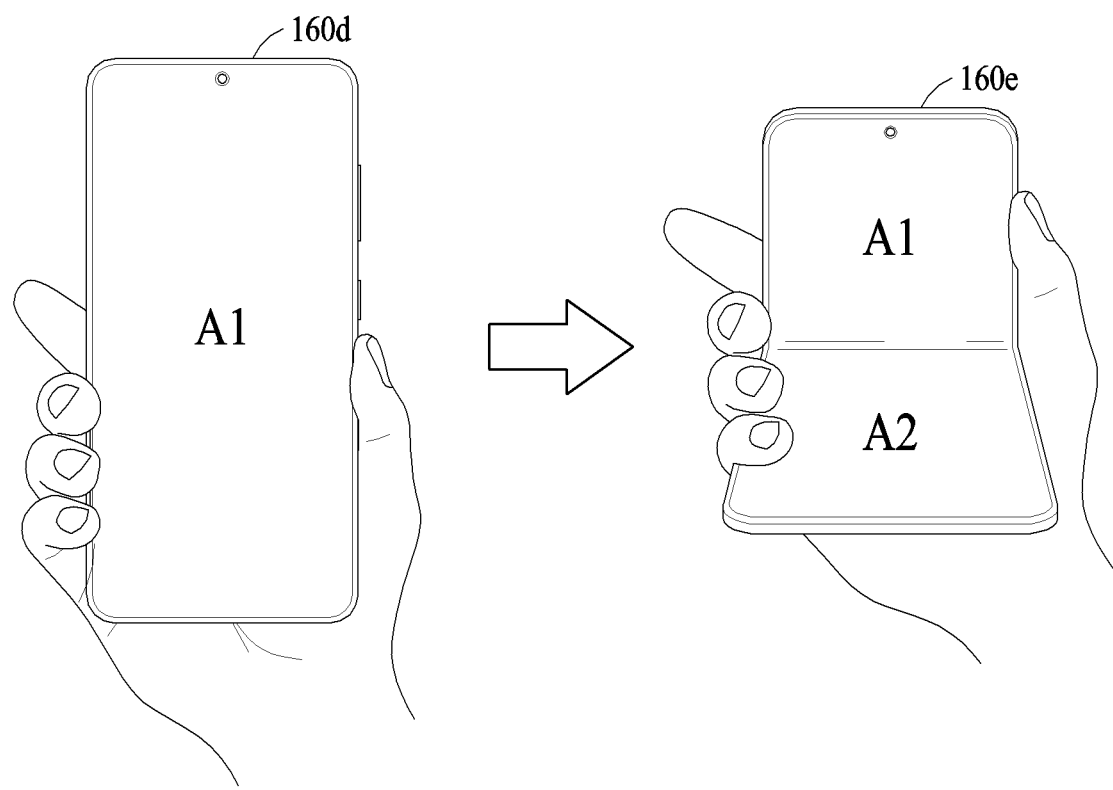

FIG. 12 illustrates an activity output in an electronic device (e.g., electronic device 101 of FIG. 1) of a flex-type according to various example embodiments.

In FIG. 12, the electronic device may output Activity A1 on a display module 160d that is in an unfolded state. The electronic device may output Activity A1 on the top region of a display module 160e and Activity A2 on the bottom region of the display module 160e that is in a bent state or a folded state.

For example, an activity record group corresponding to the top region may include Activity A1, and an activity record group corresponding to the bottom region may include Activity A2. In the unfolded state, the electronic device may output Activity A1 included in the activity record group corresponding to the top region on the display module 160d. Since Activity A1 is output, the electronic device may output Activity A1 on the entire display module 160d.

When a state of the display module changes to be in a bent state, the electronic device may output, on the display module 160e, Activity A1 included in the activity record group corresponding to the top region and Activity A2 included in the activity record group corresponding to the bottom region. Each of the activities may be output at a location on the display module 160e corresponding to a value of boundary set in the activity record group to which the activity belongs.

Figure 13:
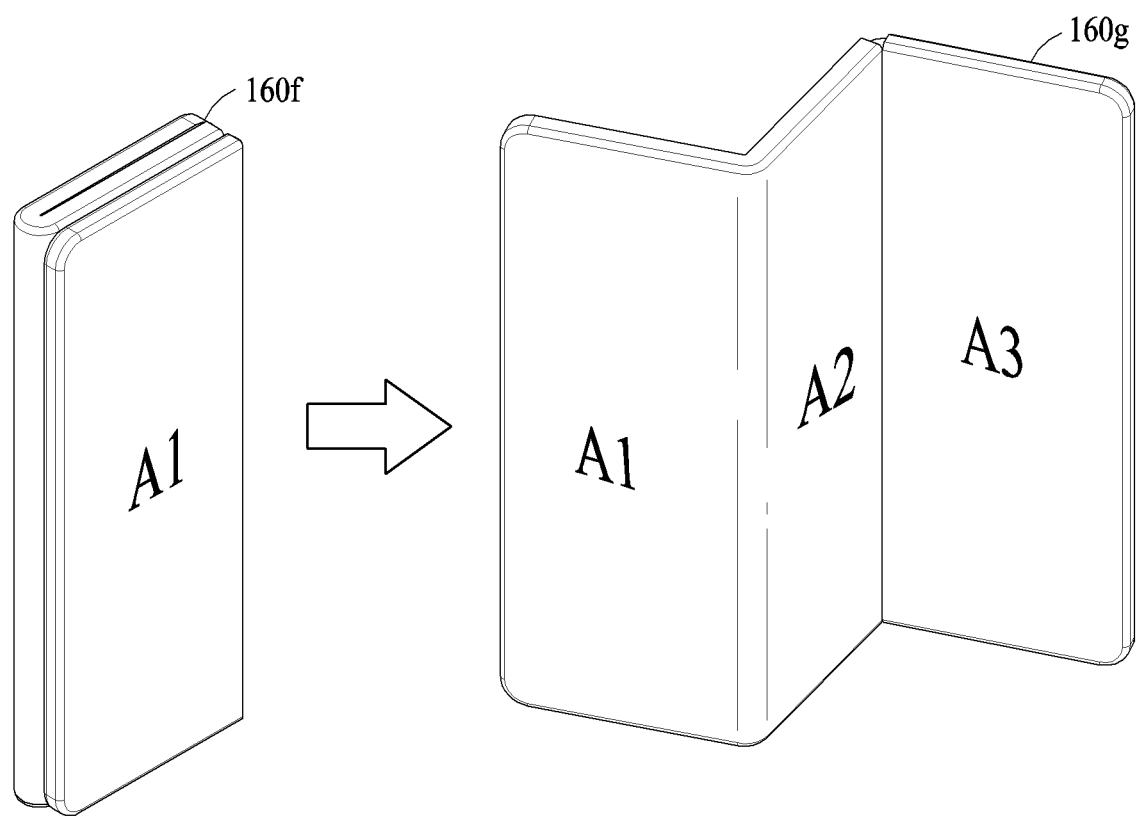

FIG. 13 illustrates an activity output in an electronic device (e.g., electronic device 101 of FIG. 1) of a z-folding-type according to various example embodiments.

In FIG. 13, the electronic device may output Activity A1 on a display module 160f that is in a folded state. The electronic device may output Activity A1 on the left region, Activity A2 on the center region, and Activity A3 on the right region of a display module 160g that is in an unfolded state.

Figure 14:
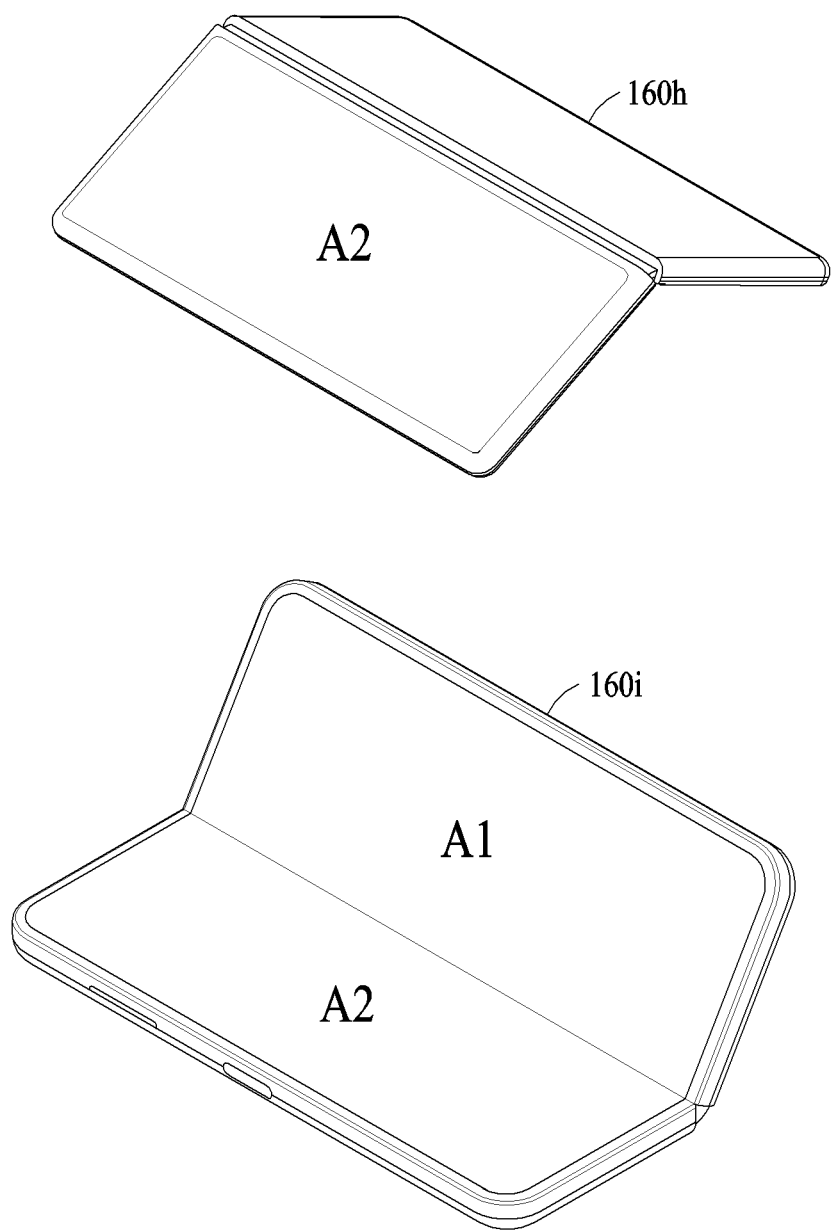

FIG. 14 illustrates an activity output in an electronic device (e.g., electronic device 101 of FIG. 1) of a folding-type according to various example embodiments.

In FIG. 14, the electronic device may output Activity A2 on a first display module 160h that is in a folded state. The electronic device may output Activity A1 on the right region, and Activity A2 on the left region of a second display module 160i that is in an unfolded state.

In FIG. 14, the first display module 160h may correspond to a display module that is visibly exposed to the outside in the folded state, and the second display module 160i may correspond to a display module provided opposite to the first display module 160h.

Figure 15A:
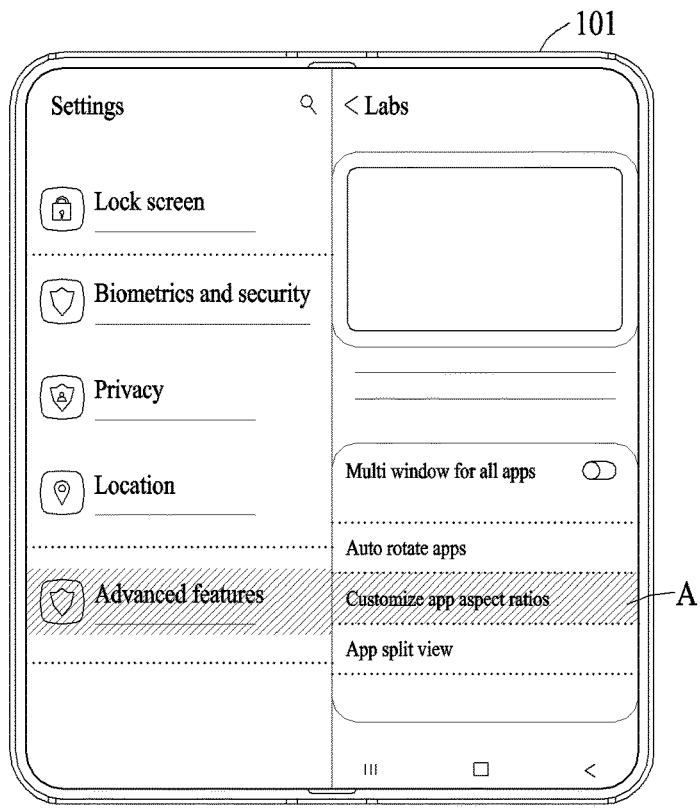
FIGS. 15A and 15B illustrate state information of a task according to various example embodiments.
Figure 15B:
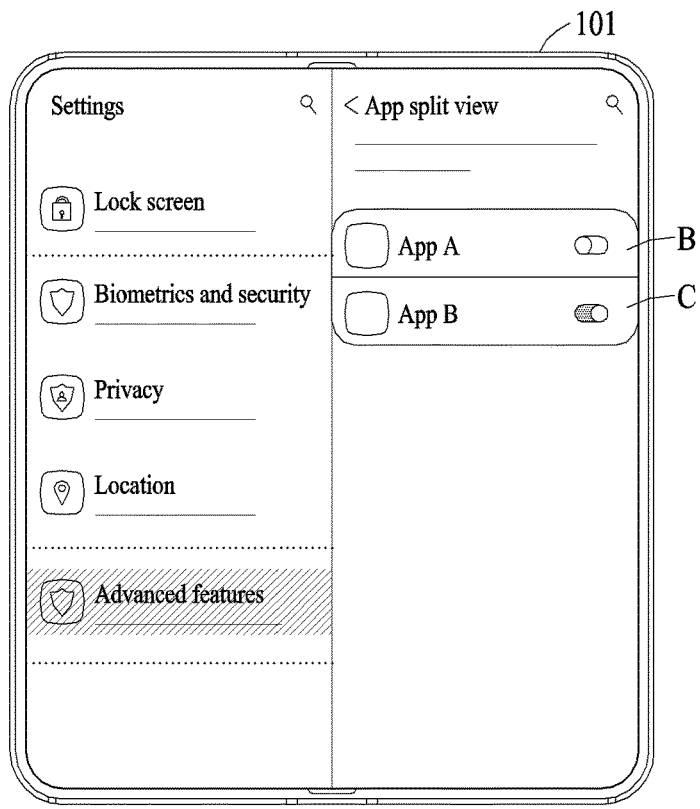

FIGS. 15A and 15B illustrate state information of a task (e.g., the task 400 of FIGS. 4A, 4B) according to various example embodiments. For example, the state information of the task may be information indicating whether a plurality of activities executed in the task is output on a display module (e.g., the display module 160 of FIG. 1). For example, the electronic device 101 may set the state information of the task, based on a user input. For example, the electronic device 101 may output a single activity or a plurality of activities, based on the state information of the task.

FIGS. 15A and 15B may correspond to a user interface (UI) for displaying and/or setting the state information of the task in the electronic device 101 according to various example embodiments. The UI of the electronic device 101 illustrated in FIGS. 15A and 15B is an example for setting the state information of the task. Various UIs different from the UI illustrated in FIGS. 15A and 15B may be provided to provide a user with the state information of the task and may receive a user input for setting the state information of the task.

Referring to FIG. 15A, the electronic device 101 may provide the display module with a menu for displaying and/or setting whether the plurality of activities executed in the task is output on the display module. As illustrated in FIG. 15A, the electronic device 101 may provide the UI with a menu, such as App Split View (A), for the user to set the state information of the task.

FIG. 15B illustrates the UI provided by the electronic device 101 when a user input is received for App Split View (A) in FIG. 15A.

In FIG. 15B, the state information of App A may be a deactivated state (B), and the state information of App B may be an activated state (C). The deactivated state (B) may be referred to as "Activity-split off state", and the activated state (C) may be referred to as "Activity-split on".

For example, the electronic device 101 may output a single activity or a plurality of activities on the display module, based on the state information of the task. For example, the electronic device 101 may change the state information of the task, based on the user input.

Even when Activity A2 is executed from Activity A1 in App A, and pair information between Activity A1 and Activity A2 is defined, the electronic device 101 may output Activity A2 on the display module, based on the state information of App A that is in the deactivated state (B).

In other words, when the state information of the task is the deactivated state (B), even in a case that the plurality of activities is executed in the task, and the pair information defined between the plurality of activities is identified, the electronic device 101 may output a single activity on the display module.

When Activity B2 is executed from Activity B1 in App B, and the pair information between Activity B1 and Activity B2 is defined, the electronic device 101 may output Activity B1 and Activity B2 based on the state information of App B that is in the activated state (C).

In FIGS. 15A-15C, the electronic device 101 may set and/or change the state information of the task, based on an input received from the user. For example, when the task is newly installed in the electronic device 101, the state information of the task may be set to be the activated state or the deactivated state. For example, an initial value of the state information of the task newly installed may be determined according to a user's setting or an initial value pre-set in the electronic device 101.

For example, when the task is newly installed in the electronic device 101, the electronic device 101 may provide the user with the UI for setting the state information of the task. The electronic device 101 may set the state information of the newly installed task, based on the input received from the user.

For example, when the state information of the task is the deactivated state (B), the electronic device 101 may set the plurality of activities executed in the task in a plurality of activity record groups (e.g., the activity record groups 402 of FIGS. 4A, 4B), based on the pair information. For example, when the plurality of activities that the pair information is defined therebetween is executed, and the state information of the task is changed from the deactivated state (B) to the activated state (C), the electronic device 101 may output the plurality of activities on the display module, based on the state information of the task and the pair information.

A method of performing an output on a display module 160 of an electronic device 101, according to various example embodiments, may include identifying a plurality of activities executed in the same task 400 (e.g., the task 525 of FIG. 5), identifying pair information on a relationship between the plurality of activities, and outputting at least one activity of the plurality of activities on the display module 160 of the electronic device 101, based on the pair information.

The method of performing an output on the display module 160 may further include setting the plurality of activities in the plurality of activity record groups 402 (e.g., the activity record groups 515 of FIG. 5) partitioned according to a plurality of regions to output the activities on the display module 160 and determining the activities to be output on the display module 160 in the plurality of activity record groups 402.

The plurality of activity record groups 402 may determine the visibility and the lifecycle of the activities set in the plurality of activity record groups 402.

The setting of the plurality of activities may determine the activity record groups 402 in which the plurality of activities are to be set, based on the pair information.

The identifying of the pair information may include identifying at least one of pair information received from the server 108 capable of communicating with the electronic device 101, pair information pre-set in the task 400, and pair information set according to a user input.

The method of performing an output on a display module may include outputting an indicator that is displayed on the top of the display module 160, based on at least one activity output on the display module 160.

The method of performing an output on a display module may further include identifying an output region to output the plurality of activities according to the information and the state of the display module 160, wherein the outputting of the at least one activity on the display module 160 may include outputting the at least one activity on the display module 160, based on the output region.

The electronic device 101 configured to perform a method of performing an output on a display module, according to various example embodiments, may include the display module 160 and the processor 120, where the processor 120 may identify the plurality of activities executed in the same task 400 (e.g., the task 525 of FIG. 5), identify pair information on a relationship between the plurality of activities, and output at least one activity of the plurality of activities on the display module 160, based on the pair information.

The processor 120 may set the plurality of activities in the plurality of activity record groups 402 (e.g., the activity record groups 515 of FIG. 5) partitioned according to regions to output the activities on the display module 160 and determine the activities to output on the display module 160 in the plurality of activity record groups 402.

The processor 120 may determine the visibility and the lifecycle of the activities set in the plurality of activity record groups 402.

The processor 120 may determine the activity record groups 402 in which the plurality of activities are to be set, based on the pair information.

The processor 120 may identify at least one of pair information received from the server 108 capable of communicating with the electronic device 101, pair information pre-set in the task 400, and pair information set according to a user input.

The processor 120 may output the indicator that is displayed on the top of the display module 160, based on at least one activity output on the display module 160.

The processor 120 may identify the output region to output the plurality of activities according to a change in the region of the display module and may output the at least one activity on the display module 160, based on the output region.

The electronic device 101 configured to performing a method of performing an output on a display module, according to various example embodiments, may include the display module 160 and the processor 120, wherein the processor 120 may set state information of a task based on a user input, identify a plurality of activities executed in the task, identify pair information on a relationship between the plurality of activities, and output at least one activity of the plurality of activities on the display module 160, based on the pair information and the state information of the task.

The state information of the task may be selectable between an activity-split off state (e.g. deactivated) and an activity-split on state (e.g., activated) through a user interface on the display module 160.

The processor 120 may output a single activity of the plurality of activities on the display module 160 based on determining that the state information of the task is in the activity-split off state.

The processor 120 may output two or more activities on two or more regions of the display module 160 based on determining that the state information of the task is in the activity-split on state.

The processor 120 may provide a user with a user interface to set the state information based on a newly installed task.

The processor 120 may set the state information of a newly installed task to an initial value pre-set in the electronic device.

What is claimed is:

1. A method of performing an output on a display module of an electronic device, the method comprising:
   identifying a plurality of activities executed in a same task;
   identifying pair information on a relationship between the plurality of activities; and
   outputting at least one activity of the plurality of activities on the display module of the electronic device, based on the pair information:
   setting the plurality of activities in a plurality of activity record groups partitioned according to a plurality of regions to output the activity on the display module, based on the pair information; and
   determining the activity to be output on the display module from the plurality of activity record groups,
   wherein the pair information includes a first pair information with a first activity as source and a second activity as target and a second pair information with the second activity as source and a third activity as target, and
   wherein the setting of the plurality of activities comprises:
   setting the first activity and the second activity are included in the same or different activity record group.

2. The method of claim 1, wherein the plurality of activity record groups determines a visibility and a lifecycle of the activities set in the plurality of activity record groups.

3. The method of claim 1, wherein the setting of the plurality of activities comprises determining the plurality of activity record groups in which the plurality of activities are to be set, based on the pair information.

4. The method of claim 1, wherein the identifying of the pair information comprises identifying at least one of pair information received from a server capable of communicating with the electronic device, pair information pre-set in the task, and pair information set according to a user input.

5. The method of claim 1, further comprising:
   outputting an indicator displayed on a top of the display module, based on the at least one activity output on the display module.

6. The method of claim 1, further comprising:
   identifying an output region capable of outputting the plurality of activities according to information on the display module and a state of the display module,
   wherein the outputting of the at least one activity on the display module comprises outputting the at least one activity on the display module, based on the output region.

7. The method of claim 1, further comprising:
   changing the output to the display module based on the pair information and a change of a display size of the display module, wherein the display module is a slidable-type, a rollable-type, or a folding-type display.

8. An electronic device comprising:
   a display module; and
   a processor,
   wherein the processor is configured to:
   identify a plurality of activities executed in a same task;
   identify pair information on a relationship between the plurality of activities; and
   output at least one activity of the plurality of activities on the display module, based on the pair information;
   set the plurality of activities in a plurality of activity record groups partitioned according to a plurality of regions to output the activity on the display module, based on the pair information; and
   determine the activity to be output on the display module from the plurality of activity record groups,
   wherein the pair information includes a first pair information with a first activity as source and a second activity as target and a second pair information with the second activity as source and a third activity as target, and wherein the processor is configured to:
set the first activity and the second activity are included in the same or different activity record group.

9. The electronic device of claim 8, wherein the processor is configured to determine a visibility and a lifecycle of the activities set in the plurality of activity record groups.

10. The electronic device of claim 8, wherein the processor is configured to determine the activity record groups in which the plurality of activities are to be set, based on the pair information.

11. The electronic device of claim 8, wherein the processor is configured to identify at least one of pair information received from a server capable of communicating with the electronic device, pair information pre-set in the task, and pair information set according to a user input.

12. The electronic device of claim 8, wherein the processor is configured to output an indicator displayed on a top of the display module, based on the at least one activity output on the display module.

13. The electronic device of claim 8, wherein the processor is configured to:
identify an output region capable of outputting the plurality of activities according to a change in a region of the display module; and
output the at least one activity on the display module, based on the output region.

14. An electronic device comprising:
a display module; and
a processor,
wherein the processor is configured to:
set state information of a task based on a user input;
identify a plurality of activities executed in the task;
identify pair information on a relationship between the plurality of activities; and
output at least one activity of the plurality of activities on the display module, based on the pair information and the state information of the task;
set the plurality of activities in a plurality of activity record groups partitioned according to a plurality of regions to output the activity on the display module, based on the pair information; and
determine the activity to be output on the display module from the plurality of activity record groups,
wherein the pair information includes a first pair information with a first activity as source and a second activity as target and a second pair information with the second activity as source and a third activity as target, and
wherein the processor is configured to:
set the first activity and the second activity are included in the same or different activity record group.

15. The electronic device of claim 8, wherein the processor is configured to:
change the output to the display module based on the pair information and a change of a display size of the display module, wherein the display module is a slidable-type, a rollable-type, or a folding-type display.

16. The electronic device of claim 14, wherein the state information of the task is selectable between an activity-split off state and an activity-split on state through a user interface on the display module.

17. The electronic device of claim 16, wherein the processor is configured to output a single activity of the plurality of activities on the display module based on determining that the state information of the task is in the activity-split off state.

18. The electronic device of claim 16, wherein the processor is configured to output two or more activities on two or more regions of the display module based on determining that the state information of the task is in the activity-split on state.

19. The electronic device of claim 14, wherein the processor is configured to provide a user with a user interface to set the state information based on a newly installed task.

20. The electronic device of claim 14, wherein the processor is configured to set the state information of a newly installed task to an initial value pre-set in the electronic device.

* * * * *